(12) United States Patent
Figueroa et al.

(10) Patent No.: US 8,144,739 B2
(45) Date of Patent: Mar. 27, 2012

(54) SYSTEM METHOD AND APPARATUS FOR SELECTING AND CONTROLLING LIGHT SOURCE BANDWIDTH

(75) Inventors: Efrain Figueroa, San Diego, CA (US);
William N. Partlo, Poway, CA (US);
John Martin Algots, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 350 days.

(21) Appl. No.: 12/605,306

(22) Filed: Oct. 23, 2009

(65) Prior Publication Data

US 2010/0149647 A1 Jun. 17, 2010

Related U.S. Application Data

(60) Provisional application No. 61/197,246, filed on Oct. 24, 2008.

(51) Int. Cl.
*H01S 3/10* (2006.01)
(52) U.S. Cl. .................................. 372/25; 372/102
(58) Field of Classification Search .............. 372/25, 372/102; 359/566, 572, 573, 615
See application file for complete search history.

(56) References Cited

U.S. PATENT DOCUMENTS

| | | | | |
|---|---|---|---|---|
| 5,095,492 | A * | 3/1992 | Sandstrom | 372/102 |
| 5,970,082 | A * | 10/1999 | Ershov | 372/102 |
| 6,094,448 | A * | 7/2000 | Fomenkov et al. | 372/102 |
| 6,163,559 | A * | 12/2000 | Watson | 372/102 |
| 6,212,217 | B1 * | 4/2001 | Erie et al. | 372/102 |
| 7,006,538 | B2 * | 2/2006 | Bushida et al. | 372/14 |
| 7,154,928 | B2 | 12/2006 | Sandstrom et al. | |
| 7,471,455 | B2 * | 12/2008 | Das et al. | 359/618 |
| 2006/0114956 | A1 * | 6/2006 | Sandstrom et al. | 372/55 |
| 2006/0114958 | A1 | 6/2006 | Trintchouk et al. | |
| 2007/0297467 | A1 | 12/2007 | Formenkov et al. | |
| 2008/0159692 | A1 | 7/2008 | Yao | |
| 2008/0232408 | A1 * | 9/2008 | O'Brien et al. | 372/19 |
| 2011/0194580 | A1 * | 8/2011 | Algots et al. | 372/55 |

* cited by examiner

*Primary Examiner* — Mark Consilvio
(74) *Attorney, Agent, or Firm* — Martine Penilla Group, Inc.

(57) ABSTRACT

The bandwidth selection mechanism includes a first actuator mounted on a second face of a dispersive optical element, the second face being opposite from a reflective face, the first actuator having a first end coupled to a first end block and a second end coupled to a second end block, the first actuator being operative to apply equal and opposite forces to the first end block and the second end block to bend the body of the dispersive optical element along the longitudinal axis of the body and in a first direction normal to the reflective face of the dispersive optical element. The bandwidth selection mechanism also includes a second actuator being operative to apply equal and opposite forces to bend the body along the longitudinal axis of the body, in a second direction perpendicular to the reflective face of the dispersive optical element.

14 Claims, 17 Drawing Sheets

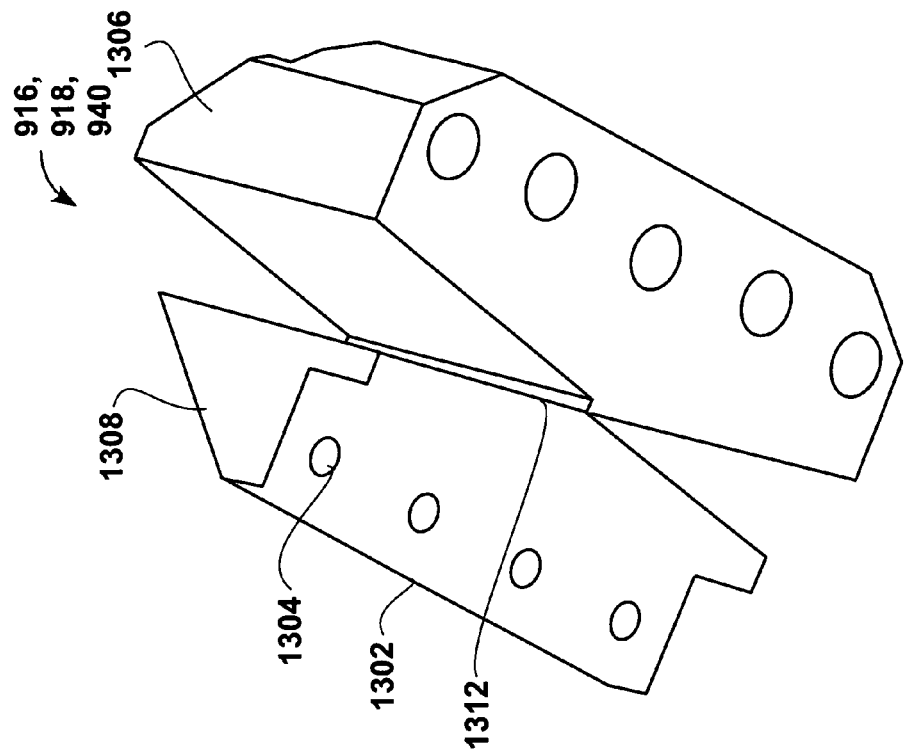
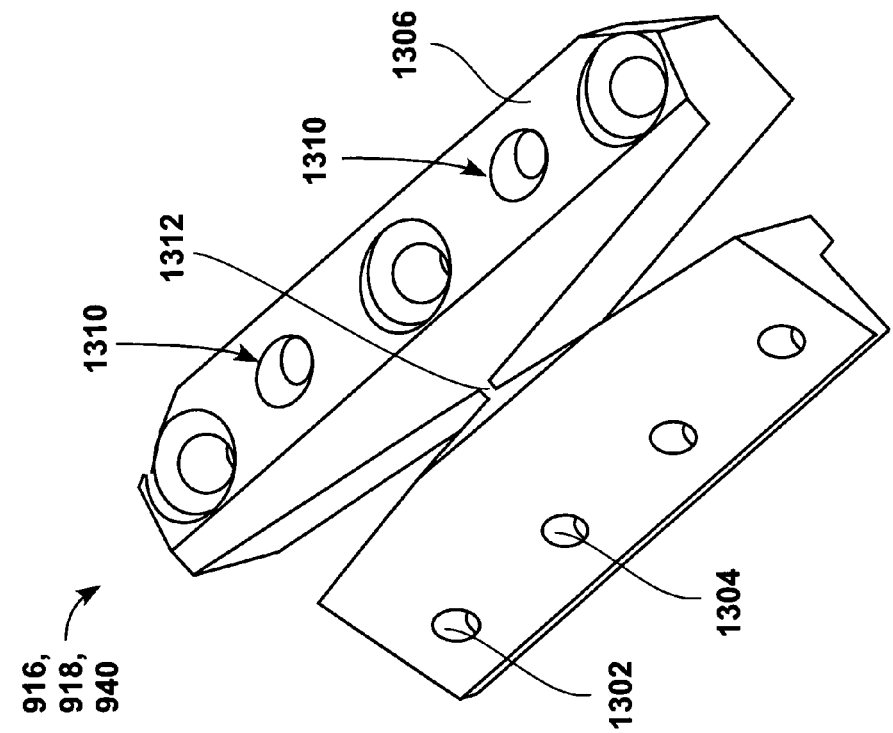
FIG. 13B
FIG. 13A

SYSTEM METHOD AND APPARATUS FOR SELECTING AND CONTROLLING LIGHT SOURCE BANDWIDTH

CROSS REFERENCE TO RELATED APPLICATIONS

This application claims priority from U.S. Provisional Patent Application No. 61/197,246, filed Oct. 24, 2008 and entitled "Bandwidth Control Device," which is incorporated herein by reference in its entirety for all purposes.

BACKGROUND

The present invention relates generally to optical gratings, and more particularly, to systems methods and apparatus for tuning and controlling bandwidth by bending an optical grating to select a bandwidth of wavelengths of light centered on a selected center wavelength.

Gratings are commonly used to select a narrowed light beam. However, the bandwidth of wavelengths in the narrowed light beam is not as easily selectable with a typical grating. FIG. 1 is a simplified schematic of a typical light beam narrowing system 100. The typical light beam narrowing system 100 includes a source light beam 102, directed through a beam expander 104 (typically including one or more prisms), and a grating 106. The grating 106 has a reflecting surface 108 with many grating lines 110. The reflecting surface 108 has a curve 112 substantially equaling a wavefront curve 114 of the expanded source light beam 102A. It should be noted that the components 102-114 of the light beam narrowing system 100 are not drawn to scale and specifically the curve 112, wavefront 114 and the pitch of the grating are exaggerated for exemplary purposes.

The expanded source light beam 102A includes multiple wavelengths 116A-n of light. The multiple wavelengths 116A-n of light are diverging at different angles relative to the beam expander 104 and impinge on the reflecting surface 108 in corresponding different locations.

Ideally, a selected grating line 110A reflects a narrowed light beam 124 including only the corresponding reflected wavelength 116E' toward the beam expander 104 at the appropriate angle 118 such that the narrowed light beam 124 passes back though the beam expander 104 to the optical system 120 beyond the beam expander 104. Unfortunately, the selected grating line 110A also reflects a bandwidth of wavelengths including slightly shorter wavelengths 1502A than the reflected center wavelength 116E' and slightly longer wavelengths 1502B than the reflected center wavelength 116E'. Thus the narrowed light beam 124 includes the reflected center wavelength 116E' and the bandwidth of wavelengths including slightly shorter wavelengths 1502A than the reflected center wavelength 116E' and slightly longer wavelengths 1502B than the reflected center wavelength 116E'.

Tuning the beam expander 104 and the amount of curvature in the curve 112 allows for a very precise center wavelength selection and a very narrow maximum bandwidth, e.g., less than 1.0 pm ($1.0 \times 10^{-12}$ meter)+/−either side of the reflected center wavelength 116E', for the narrowed light beam 124. However, tuning the beam expander 104 does not allow for accurate control or selection of both a maximum bandwidth and a minimum bandwidth for the narrowed light beam 124, e.g. a bandwidth between 0.5 to 1.0 pm+/−either side of the reflected center wavelength 116E'.

The optical system 120 can include many sub-systems that use the narrowed light beam 124. Some of the subsystems can require both a selected maximum bandwidth and a selected minimum bandwidth. By way of example, the optical system 120 can include a scanner that requires several wavelengths centered on a selected wavelength and distributed across a bandwidth of sufficient breadth that can be used to generate a desired interference pattern.

In order to satisfy continuingly more stringent requirements to control bandwidth, particularly the width of the spectrum containing a selected percentage of the intensity, i.e., 95% ("E95%" or simply "E95") or E95 separately from full width half maximum ("FWHM") the need exists to distort the wavefront interaction surface of a center wavelength selection and bandwidth selection optical element (e.g., a dispersive grating having a plurality of dispersive optical features, e.g., grooves on one face thereof. These requirements can include a need for greater range of control as well as maintaining bandwidth within some small range and/or not to exceed some selected value. This distortion needs to be in two planes and needs to be independent in each of the two planes, with as little interference between the distorting mechanisms as possible and one distorting mechanism, such as the one distorting the separation of the groove forming features across the face of the dispersive optical element (as opposed to along the length of the dispersive optical element) has been found to need to be capable of exerting more distorting force. Applicants propose such modifications to existing laser system bandwidth control mechanisms.

In view of the foregoing, there is a need for a system, method and apparatus for bending an optical grating to select a bandwidth of wavelengths of light centered on a selected center wavelength and having a selected minimum bandwidth and a selected maximum bandwidth.

SUMMARY

Broadly speaking, the present invention fills these needs by providing a system, method and apparatus for bending an optical grating to select a bandwidth of wavelengths of light centered on a selected center wavelength and having a selected minimum bandwidth and a selected maximum bandwidth. It should be appreciated that the present invention can be implemented in numerous ways, including as a process, an apparatus, a system, computer readable media, or a device. Several inventive embodiments of the present invention are described below.

Bandwidth selection systems and methods disclosed herein include bending a reflective face of dispersion of dispersive optical element in two different directions: vertically and horizontally while also substantially decoupling the vertical bending forces from the horizontal bending forces. The decoupling minimizes the interaction or interference between the vertical bending forces and the horizontal bending forces. One or more flexures are used to decouple each of the vertical bending forces and the horizontal bending forces.

One embodiment provides a mechanism for bandwidth selection that includes a dispersive optical element having a body including a reflective face of dispersion including an area of incidence extending in a longitudinal axis direction along the reflective face of the dispersive optical element. The body also includes a first end block, disposed at a first longitudinal end of the body and a second end block, disposed at a second longitudinal end of the body, the second longitudinal end being opposite the first longitudinal end. The bandwidth selection mechanism also includes a first actuator mounted on a second face of the dispersive optical element, the second face being opposite from the reflective face, the first actuator having a first end coupled to the first end block and a second end coupled to the second end block, the first actuator being operative to apply equal and opposite forces to the first end block and the second end block to bend the body along the longitudinal axis of the body and in a first direction normal to the reflective face of the dispersive optical element. The bandwidth selection mechanism also includes a second actuator mounted on a third face of the dispersive optical element, the third face being normal to the reflective face, the second actuator having a first end coupled to the first end block with a first flexture and a second end coupled to the second end block with a second flexture, the first actuator being operative to apply equal and opposite forces to the first end block and the second end block to bend the body along the longitudinal axis of the body, in a second direction perpendicular to the reflective face of the dispersive optical element, the second direction also being perpendicular to the first direction the second actuator including a pressurized fluid force application mechanism. A method of selecting bandwidth is also disclosed.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIGS. 13A and 13B are perspective views of flexured elements, in accordance with aspects of an embodiment of the disclosed subject matter.

DETAILED DESCRIPTION

Several exemplary embodiments for systems, methods and apparatus for bending an optical grating to select a bandwidth of wavelengths of light centered on a selected center wavelength and having a selected minimum bandwidth and a selected maximum bandwidth will now be described. It will be apparent to those skilled in the art that the present invention may be practiced without some or all of the specific details set forth herein.

Figure 1:
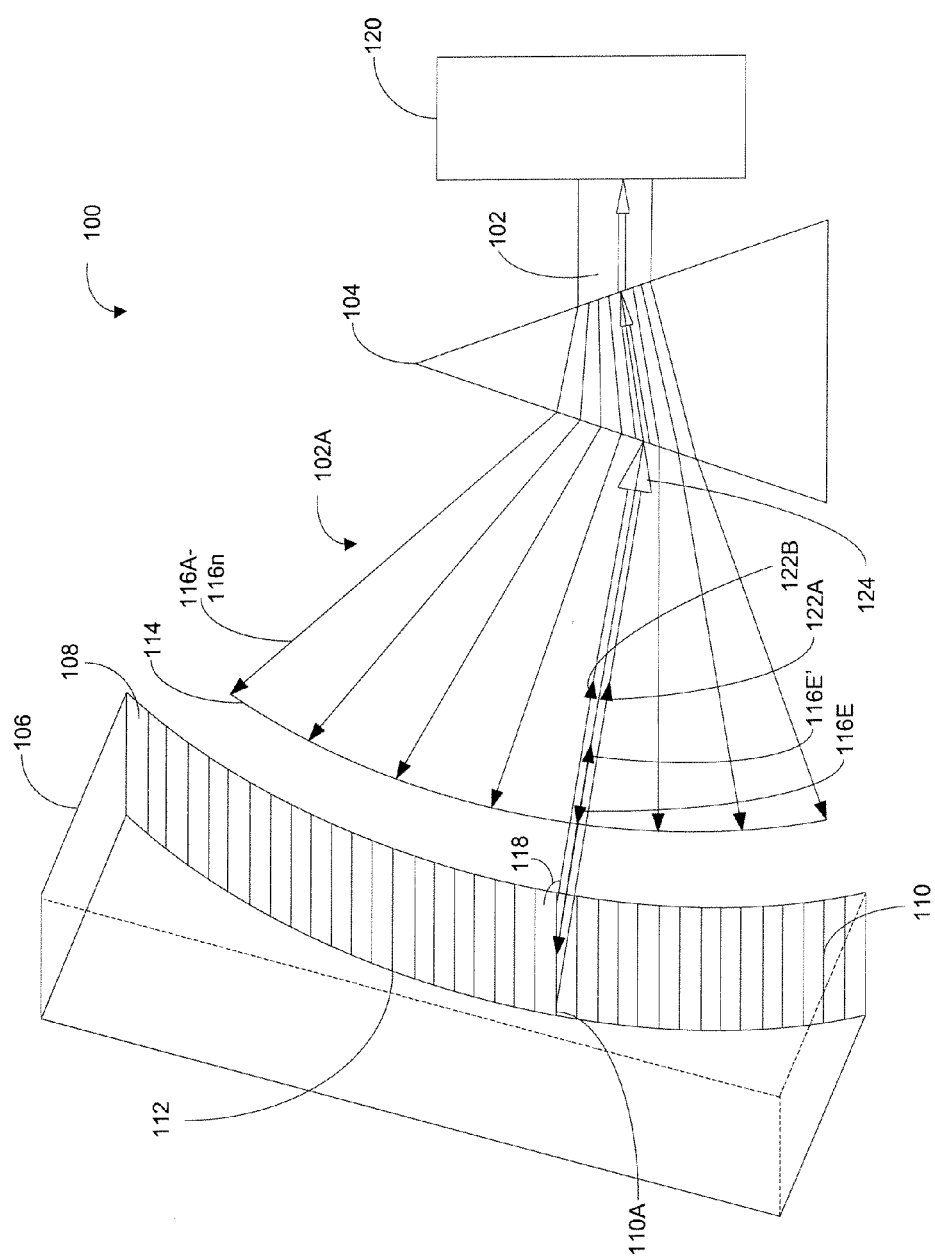
FIG. 1 is a simplified schematic of a typical light beam narrowing system.
Figure 2:
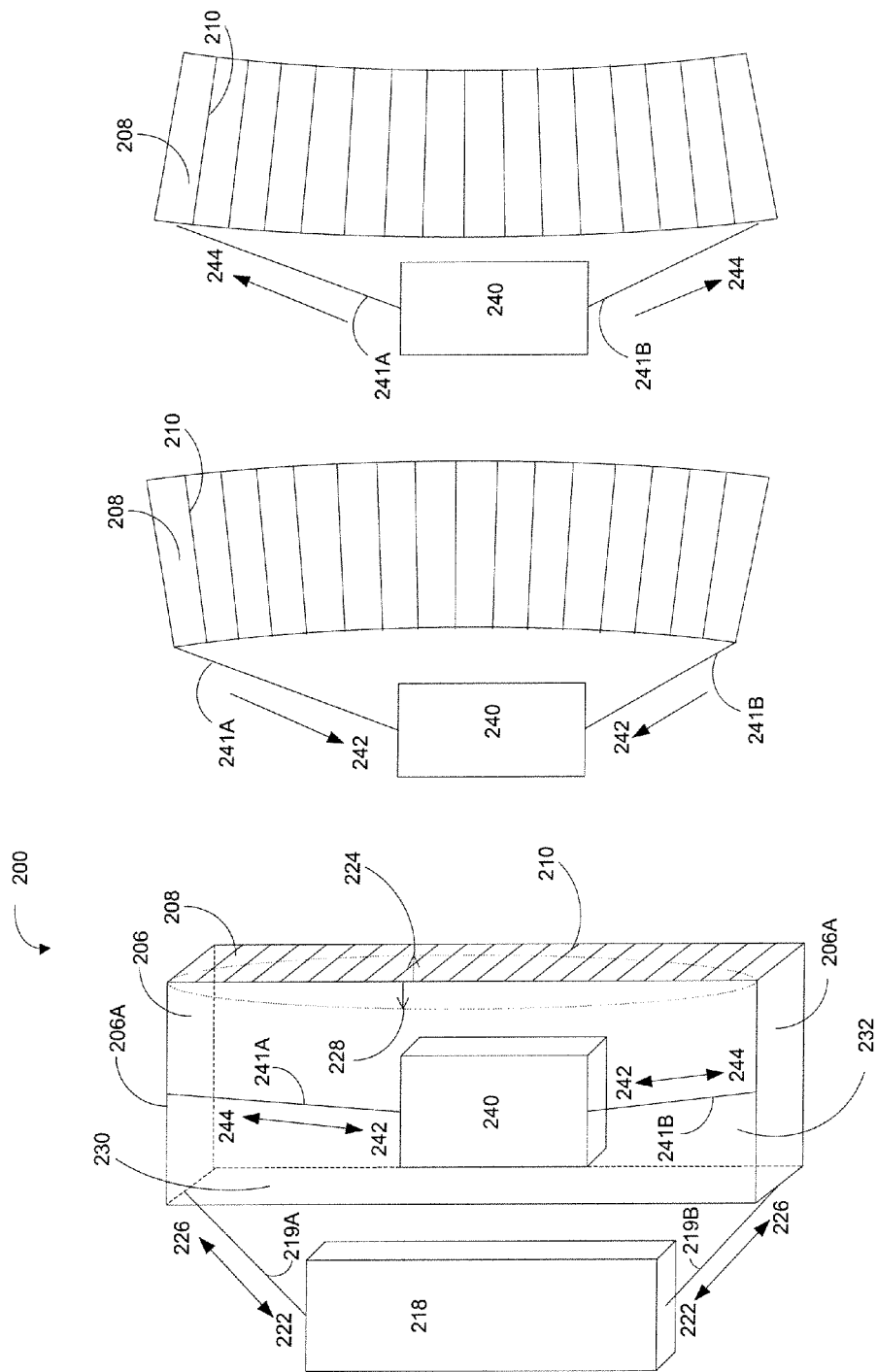
FIG. 2A is a simplified schematic of a beam control device, in accordance with aspects of an embodiment of the disclosed subject matter.
FIGS. 2B and 2C are simplified schematics of a reflecting face of a beam control device, in accordance with aspects of an embodiment of the disclosed subject matter.

FIG. 2A is a simplified schematic of a beam control device 200, in accordance with aspects of an embodiment of the disclosed subject matter. The BCD includes a grating 206 and a first force device 218. The first force device 218 is coupled to the opposing ends 206A, 206B of the grating 206 in a first plane 230.

The first force device 218 can apply a first force to the opposing ends 206A, 206B of the grating 206 though links 219A, 219B, respectively, to cause the reflecting surface 208 of the grating to bend in a controlled manner. By way of example the first force device 218 can apply a pulling force 5022 on the opposing ends 206A, 206B of the grating 206 to cause the grating to bend in a controlled, convex direction 5024. Similarly, the first force device 218 can apply a pushing force 5026 on the opposing ends 206A, 206B of the grating 206 to cause the grating to bend in a controlled, concave direction 5028. In this way the first force device 218 can bend the reflecting face 212 of the grating 206 to substantially match a wavefront curve of a lightbeam and thus select a reflected center wavelength and a maximum bandwidth of the reflected narrowed light beam.

The light beam heats the grating 206 during use. Heating the grating 206 causes the grating to expand according to a thermal expansion coefficient of the material of the grating. Typically, the grating 206 is formed from a material having a low coefficient of expansion.

The first force device 218 and the links 219A, 219B have a thermal expansion coefficient substantially similar to the grating 206 so that the first force device will expand at the same rate as the grating. Thus the force 5022, 5026 exerted by the first force device on the grating will be substantially constant across the expected thermal operational range.

A second force device 240 is coupled to the opposing ends 206A, 206B of the grating 206 in a second plane 232 different from the first plane 230. The second force device 240 is coupled to the opposing ends 206A, 206B of the grating 206 though links 241A, 241B, respectively. By way of example, the second plane 232 can be substantially perpendicular relative to the first plane 230 as shown. The second force device 240 and the links 241A, 241B have a thermal expansion coefficient substantially similar to the grating 206 so that the first force device will expand at the same rate as the grating. Thus the force 5022, 5026 exerted by the second force device on the grating will be substantially constant across the expected thermal operational range.

FIGS. 2B and 2C are simplified schematics of a reflecting face 208 of a beam control device 200, in accordance with aspects of an embodiment of the disclosed subject matter. The second force device 240 can apply a second force to the opposing ends 206A, 206B of the grating 206 to cause the grating to bend in a controlled manner. In this way the second force device 240 can bend the reflecting face 212 of the grating 206 such that the grating lines 210 are in a fan pattern on the reflecting face 208 of the grating. The fan pattern changes the shape of the reflected light beam as the edges of the reflected light beam are reflected in different direction due to the fan pattern.

By way of example, as shown in FIG. 2B, the second force device 240 can apply a pulling force 242 on the opposing ends 206A, 206B of the grating 206 to cause the fan pattern of the grating lines 210 to increase right to left. Similarly and as shown in FIG. 2C, the second force device 240 can apply a pushing force 246 on the opposing ends 206A, 206B of the grating 206 to cause the fan pattern to wider on the left and closer together of the right.

Figure 3:
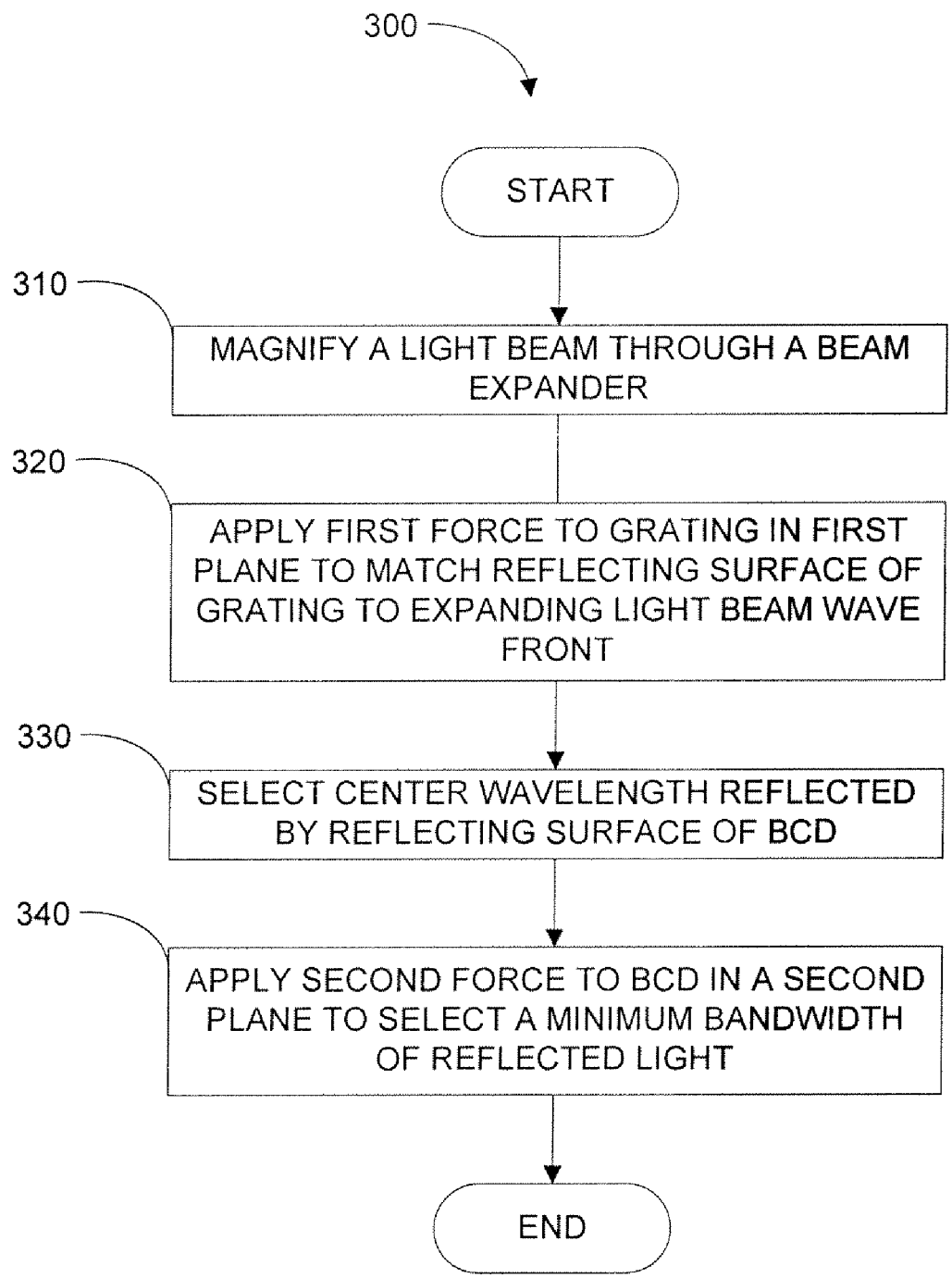
FIG. 3 is a flowchart diagram that illustrates the method operations performed in bending an optical grating to select a bandwidth of wavelengths of light centered on a selected center wavelength and having a selected minimum bandwidth and a selected maximum bandwidth, in accordance with aspects of an embodiment of the disclosed subject matter.
Figure 4:
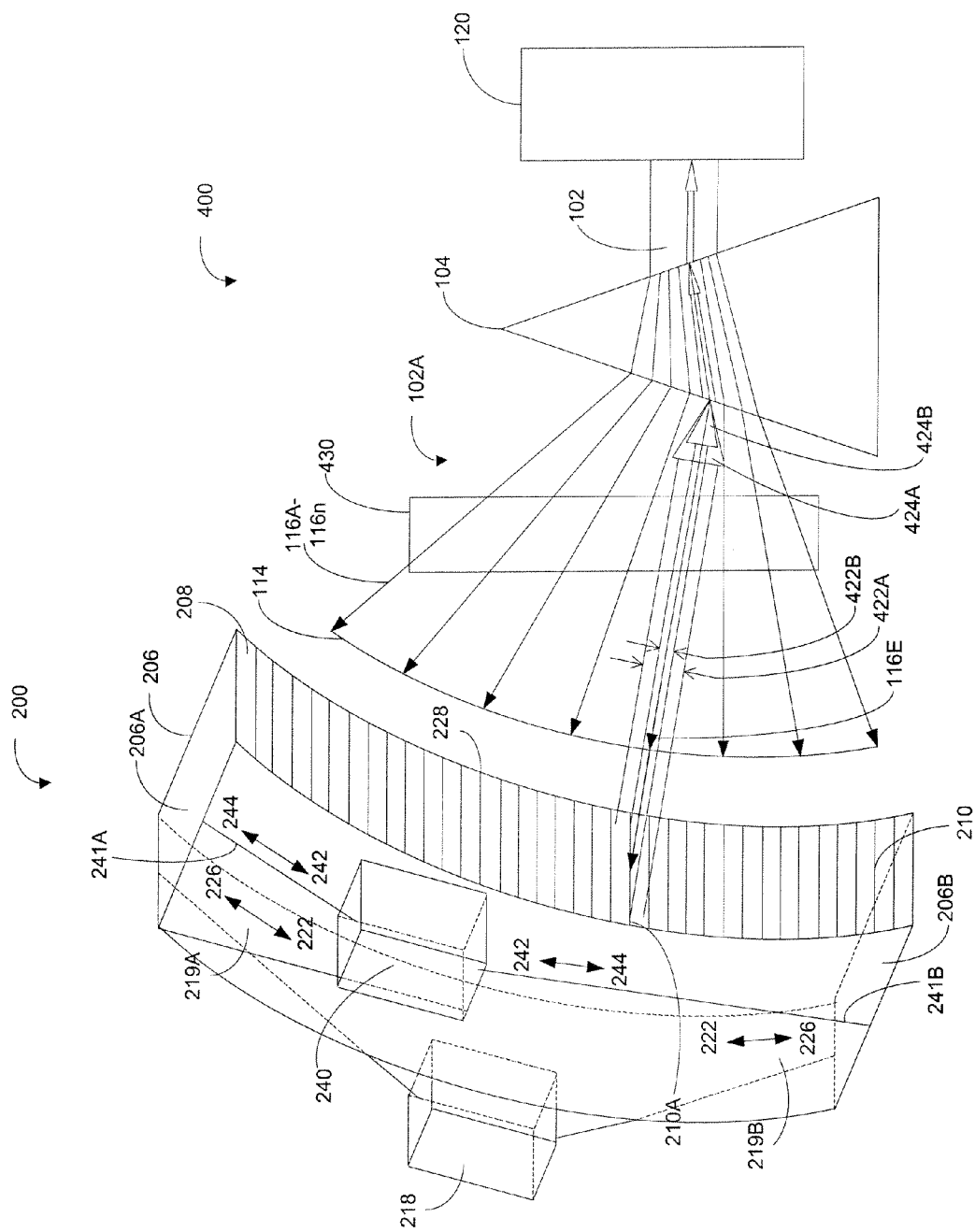
FIG. 4 is a simplified schematic of a light beam narrowing system, in accordance with aspects of an embodiment of the disclosed subject matter.

FIG. 3 is a flowchart diagram that illustrates the method operations 300 performed in bending an optical grating to select a bandwidth of wavelengths of light centered on a selected center wavelength and having a selected minimum bandwidth and a selected maximum bandwidth, in accordance with aspects of an embodiment of the disclosed subject matter. The operations illustrated herein are by way of example, as it should be understood that some operations may have sub-operations and in other instances, certain operations described herein may not be included in the illustrated operations. With this in mind, the method and operations 300 will now be described. FIG. 4 is a simplified schematic of a light beam narrowing system 400, in accordance with aspects of an embodiment of the disclosed subject matter. It should be noted that the components 102-424 of the light beam narrowing system 400 are not drawn to scale and specifically the curve 502B, wavefront 114 and the pitch of the grating are exaggerated for exemplary purposes.

In an operation 310, a light beam is passed through a magnifier such as a prism, e.g., beam expander 104, to magnify and expand or spread the light beam. In an operation 320, a first force device 218 applies a first force 222 or 226 to the opposing ends 206A, 206B of the grating 206 though links 219A, 219B, respectively, to cause the reflecting surface 208 of the grating to bend in a controlled manner. The reflecting surface 208 is bent so that the reflecting surface substantially matches a wave front 114 of the expanded light beam 102A.

In an operation 330, a center wavelength is selected. The center wavelength 116E is selected by a gridline 210A that reflects the center wavelength back toward the beam expander 104 and the optical system 120. Selecting the center wavelength 116E and matching the reflecting surface 208 to the wave front 114 of the expanded light beam 102A also determines a maximum bandwidth 422A of the narrowed reflected light beam 424A.

In an operation 340, the second force device 240 applies a second force 242 or 244 to the opposing ends 206A, 206B of the grating 206 though links 241A, 241B, respectively, to cause a fanning of the grating lines 210 on the reflecting surface 208 of the grating to increase or decease. Varying the fanning of the grating lines 210 determines a bandwidth 422B of the line-narrowed reflected light beam 424B.

The light beam narrowing system 400 can also include a variable aperture 430. The variable aperture 430 can vary the area of the grating surface that the expanded light beam impinges on. The variable aperture 430 can also increase or decrease the divergence of the expanded light beam. The divergence is the angle at which the various light beams 116A-116n are separating from one another. Increasing the divergence increases the angle between the light beams 116A-116n and also increases the difference in the angles which those light beams 116A-116n reflect off the grating 208. As a result the variable aperture 430 can increase or decrease the angles of light that are reflected back from the grating surface. In combination with the bending of the grating in horizontal and vertical directions, the variable aperture can increase the range of the reflected bandwidth from between less than about 200 fm to greater than about 1500 fm.

Figure 5:
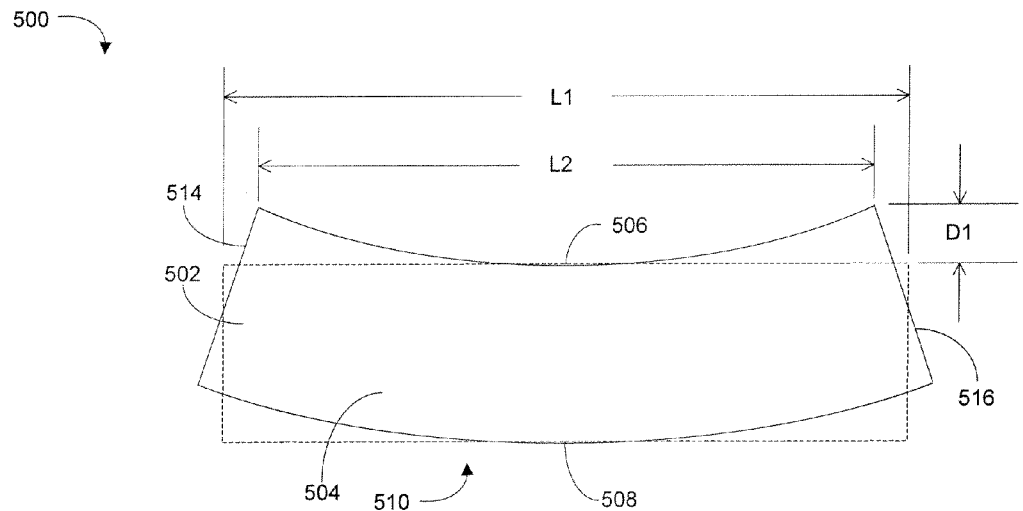
FIG. 5 is a top view of a dispersive optical element, in accordance with aspects of an embodiment of the disclosed subject matter

FIG. 5 is a top view of a dispersive optical element 500, in accordance with aspects of an embodiment of the disclosed subject matter. The dispersive optical element 500 may be used for center wavelength selection, i.e., a grating such as an eschelle grating. The dispersive optical element 500 may also serve at least in part to determine bandwidth. The dispersive optical element 500 includes a dispersive optical element body 502 having dispersive optical element top 504. It will be understood that the designation top is purely for reference and refers here to the fact that the dispersive optical element 500 when placed in a line narrowing module housing 1002, such as is shown in FIG. 10, which is a top view, will face the top of the housing 1002. The dispersive optical element 500 may also have one face forming a dispersive optical element dispersive surface 508 formed on the front face 510 of the dispersive optical element body 502. The dispersive optical element body 502 may also have a back face 506. The dispersive optical element body 502 may also have a dispersive optical element bottom 512 shown in FIGS. 6 and 9.

Figure 9:
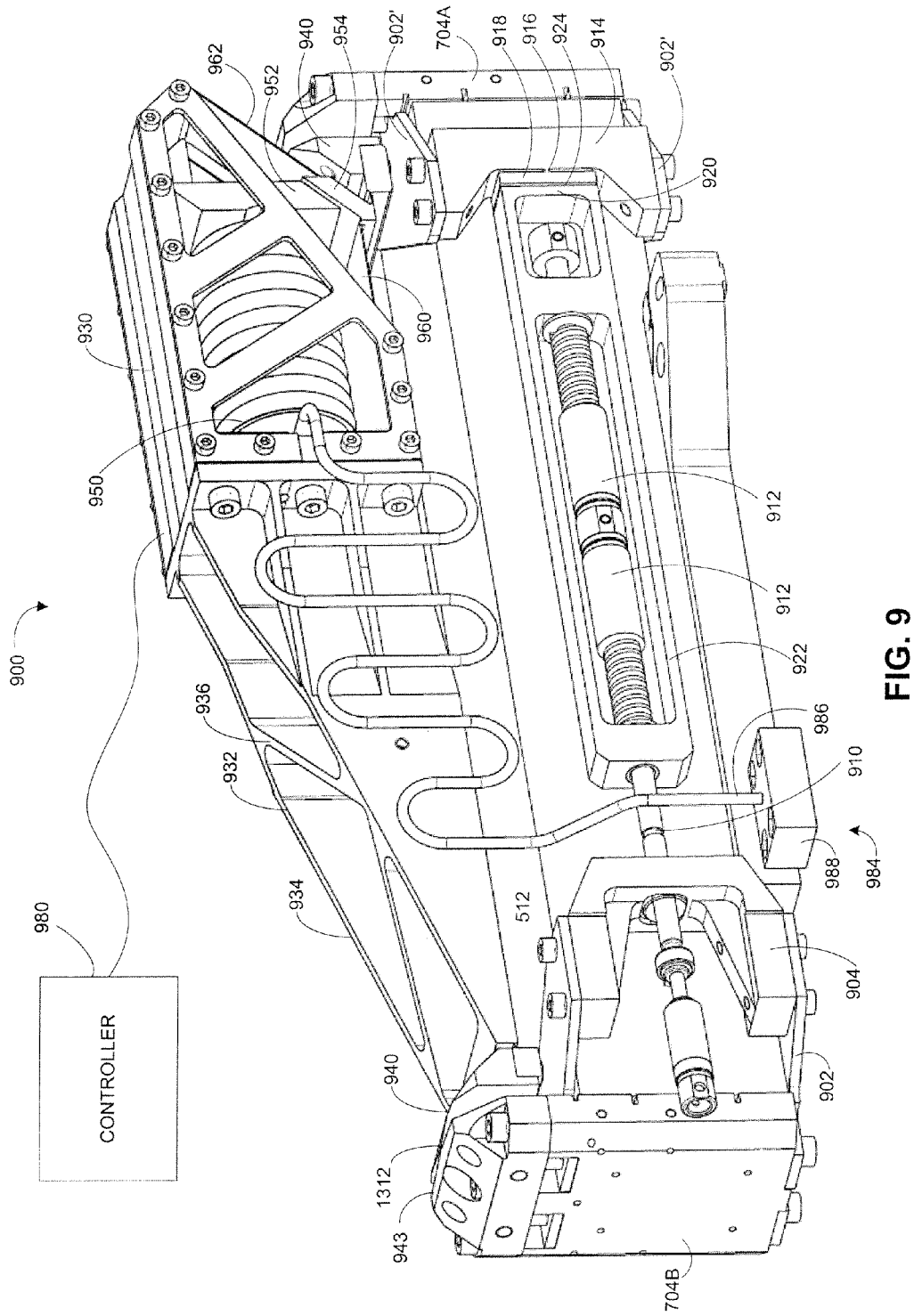
FIGS. 9-12 illustrate another dual acting bandwidth control mechanism, in accordance with aspects of an embodiment of the disclosed subject matter.
Figure 10:
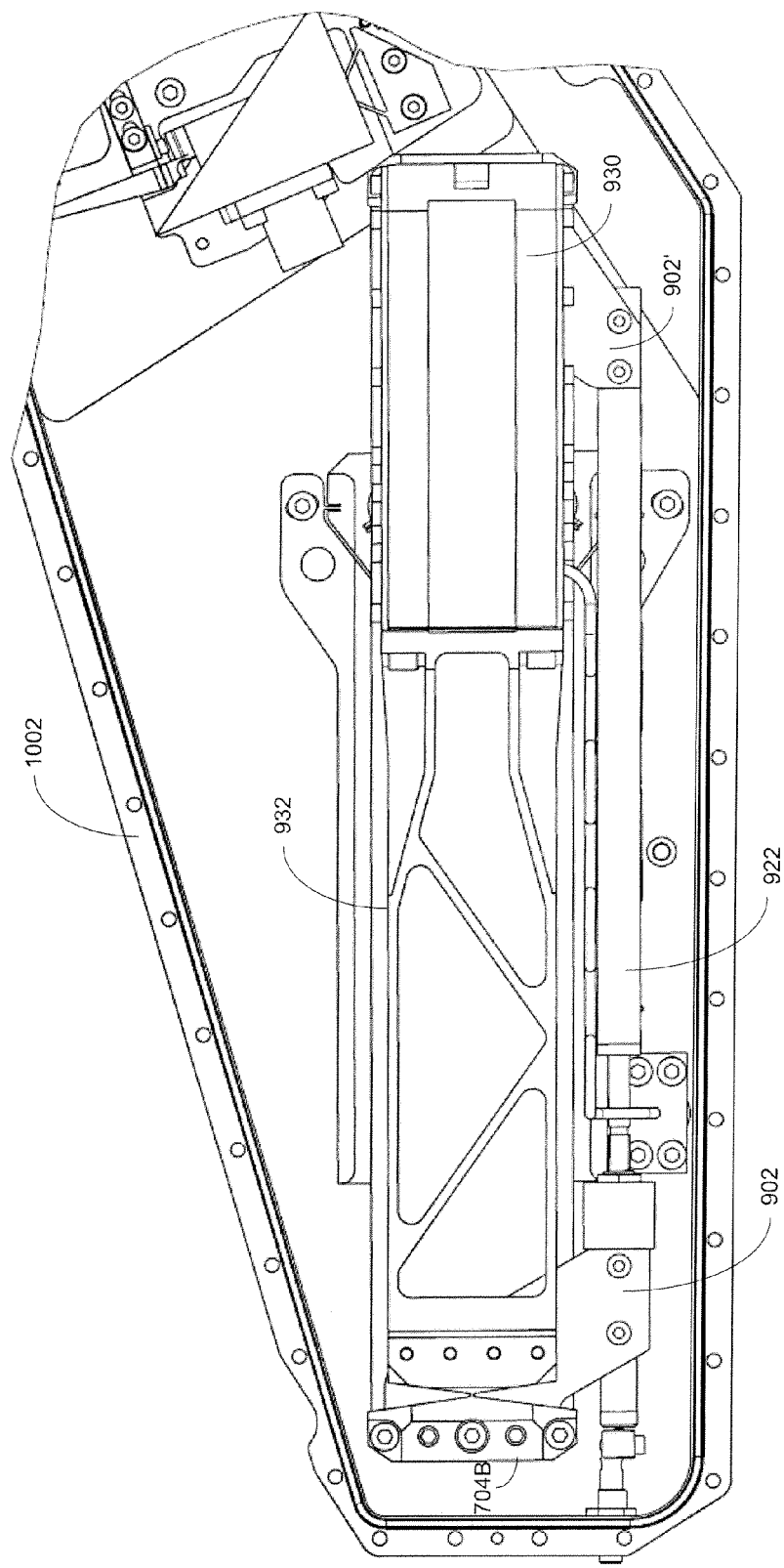
Figure 11:
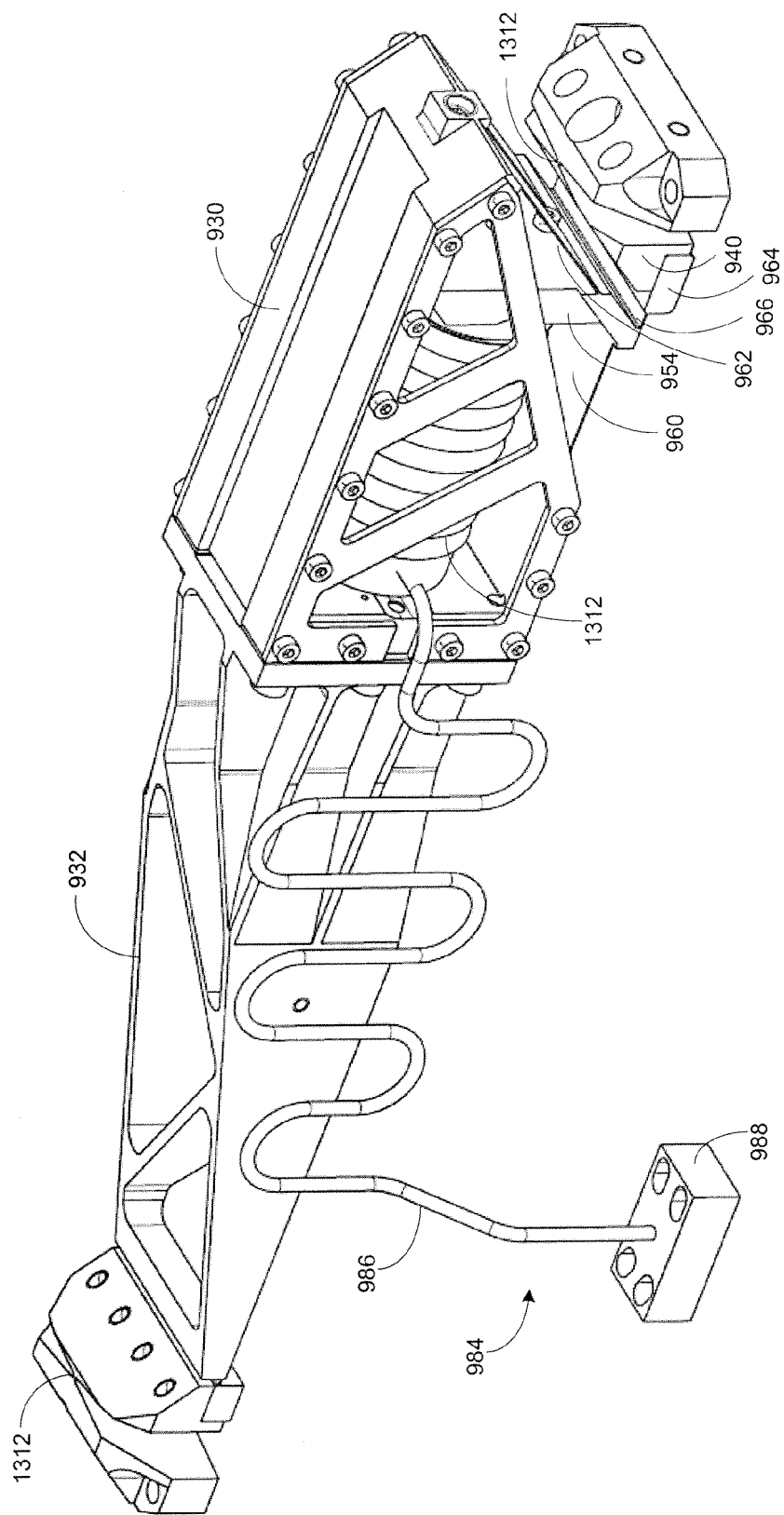
Figure 12:
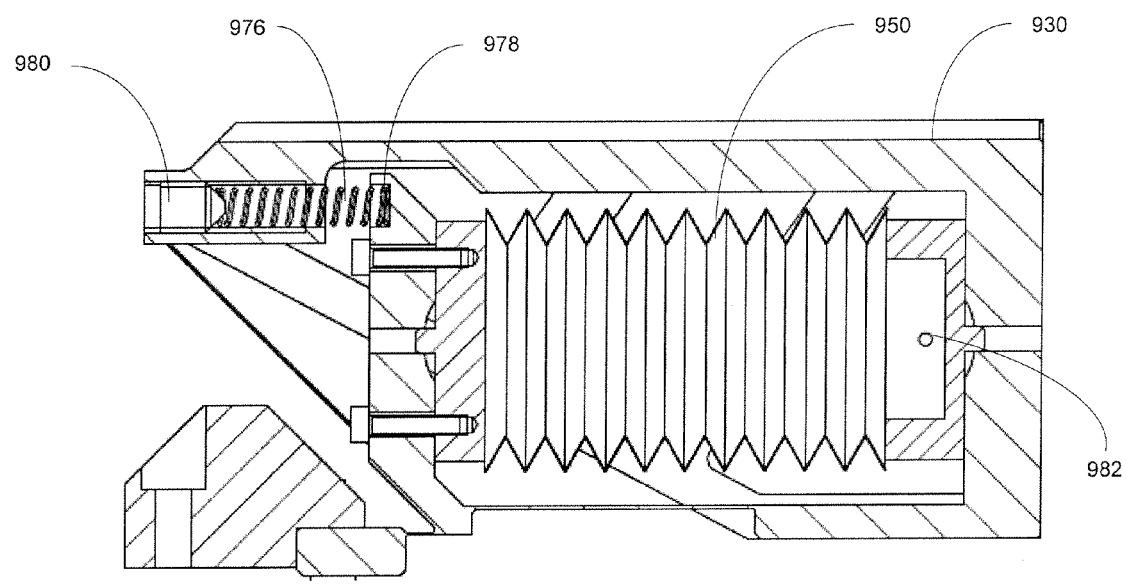

The dispersive optical element 500 may also have a dispersive optical element forward end 514 and rear end 516, it also being understood that the terms forward and rear are for reference purposes only and refer to the fact that, as illustrated in FIG. 9, the forward end is closest to the center wavelength selection mechanism 900 that delivers the light from a laser chamber, not shown and controls the angle of incidence of the light on the dispersive optical element 500 to select center wavelength.

It can be seen from FIG. 5 that applying a force to the back of the dispersive optical element as more fully described below and as is well understood in the art of such bandwidth control devices ("BCDs"), such as by holding the ends 514, 516 in place and applying a horizontal force (again for reference only and as aligned to the directions previously described for reference purposes only) to the back face 506 of the dispersive optical element body 502 in the direction toward the body 502 may induce a cylindrical deformation of the front face 510, and thus the dispersive optical element grating face 508. This can deform the grating face into a convex cylindrical shape relative to the light incident on the grating face 508 from the center wavelength selection mechanism 900. Similarly applying the force opposite to this direction can form the grating surface into a concave cylindrical shape vis-a vis the light incident from the center wavelength selection mechanism.

As can be seen in FIG. 5, the application of a compressive force along the back face 506 of the dispersive optical element body 502 can shorten an unstressed length of the back face 506 of the dispersive optical element body 502 from a length L1, as an example, to a length L2. Thus forming the back face 506 as a compressively stressed face and the front face 510 (corresponding to the grating surface 508) as a stressed face under tensile stress. For example, the grating back face 506 can be displaced from the respective back corners from the unstressed position to a stressed position of around 8 µm can form a curvature in the back face 506 on the order of about 1 km in radius of curvature, with a corresponding curvature in the front face 510 containing the grating surface 508.

Figure 6:
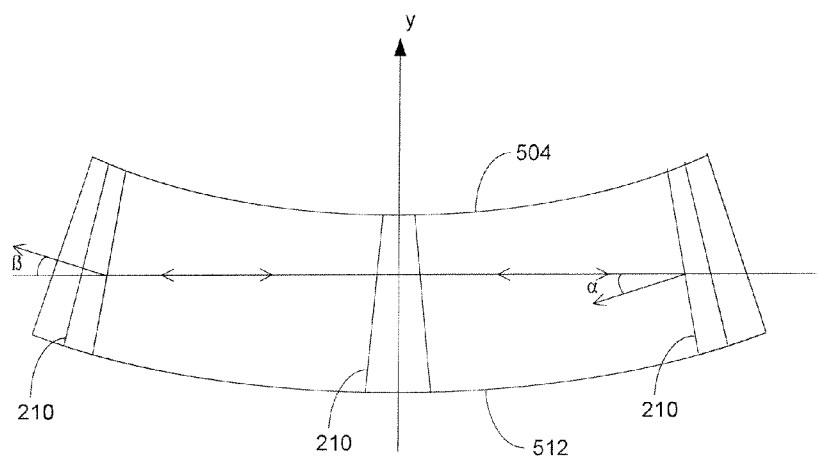
FIG. 6 is a side view of a dispersive optical element, in accordance with aspects of an embodiment of the disclosed subject matter.

FIG. 6 is a side view of a dispersive optical element 500, in accordance with aspects of an embodiment of the disclosed subject matter. The dispersive optical element 500 is shown under stress from a BCD applying force to the top surface 504, such that a dispersive optical element grating having a plurality of surface grooves 210, each having a reflective groove face, facing the forward end 514 and a groove opposing face facing in the opposite direction, each groove 210 generally perpendicular to the longitudinal axis of the grating face 508, are deformed as shown. The deformation widens the grooves 210 along the extend from the top face 504 to the bottom face 512, such that the reflective surfaces of the grooves 210 approach an angle $\beta$ with respect to an unstressed longitudinal centerline axis of the grating face 508 toward the rear end 516 and a generally opposite angle $\alpha$ toward the forward end 514.

Figure 7A:
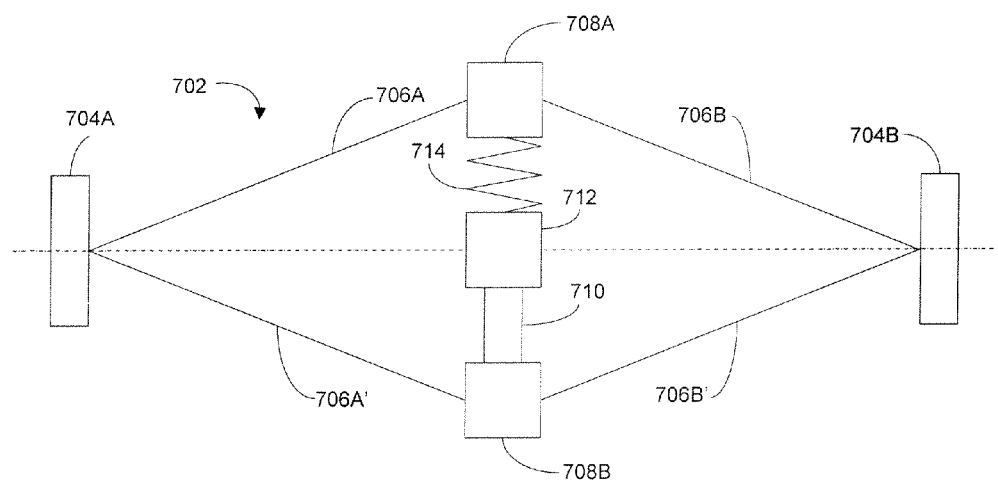
FIGS. 7A-7E are simplified schematics of various forms of actuators for applying force to a grating body, in accordance with aspects of embodiments of the disclosed subject matter.

FIGS. 7A-7E are simplified schematics of various forms of actuators for applying force to a grating body, in accordance with aspects of embodiments of the disclosed subject matter. The actuators shown in FIGS. 7A-E can be used in combination to apply force to two sides of the dispersive optical element 500, thus forming a horizontal BCD and a vertical BCD. FIG. 7A illustrates schematically an actuator 702 connected to a pair of end blocks 704A, 704B by flexures 706A, 706A', 706B and 706B' connected to moving blocks 708A, 708B. The end blocks 704A, 704B are connected to the respective ends of a grating body (not shown in FIG. 7A) similarly to what is illustrated in FIG. 9. One moving block 708B is threaded and has passing through it, in a direction orthogonal to the longitudinal axis of the actuator 702 passing through end blocks 704A, 704B, a low pitch differential screw 710.

The other moving block 708A is operatively connected to a stationary block 712 by a preloading spring 714, which may apply a tensile force between the end force blocks 704A, 704B by drawing the moving blocks 708A, 708B toward each other beyond some neutral moving block position. The resolution of the actuation can be 40 nm twist/turn of the differential screw. The range for twist-adjustment could be ±1 micron. For example 20 microns of travel of the moving block on the screw 5028 can result in an 8 microns sag as illustrated schematically in FIG. 6, i.e., 1 micron sag requires 2.5 micron travel range for the manual actuation with a resolution of 0.1 micron/turn.

Figure 7B:
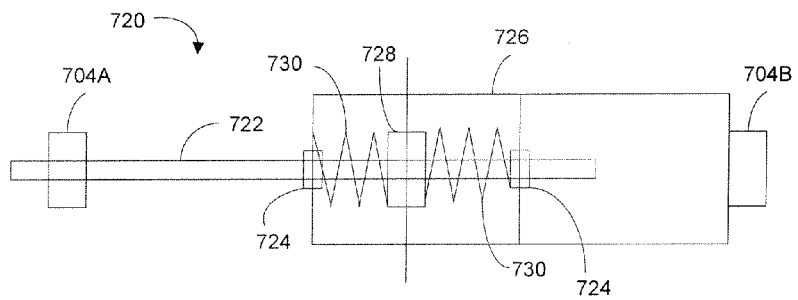

FIG. 7B illustrates schematically a concept for lowering the applied forces during the adjustment. The actuator 720 has an end block 704A attached to the grating body (not shown in FIG. 7B). FIG. 7B illustrates a BCD actuator that could be attached at blocks 704A, 704B to end mounted force plates on a grating body 502, as described above, or the block may be held stationary and block positioned to push on the grating body (not shown in FIG. 7B) in the vertical direction. A shaft 722 is threadably engaging block 704A and extends through bearings 724 on an end wall and an intermediate wall of a frame 726. The shaft 722 may have attached to it a piston 728 with respective adjacent springs 730 intermediate the end wall and the piston 728 and the piston 728 and the intermediate wall. Rotating the shaft 722 moves the block 704A with respect to the block 704B and can apply force to end force plates on the ends of the grating or to the top of the grating, as noted above.

After adjustment the threaded shaft 722 could be locked as is well known by those skilled in the art to account for high forces induced by the illustrative OBCD, as can also be the case for other embodiments, such as those illustrated in FIGS. 7A-E, 8 and 9-12. Such a BCD, as illustrated in FIGS. 7A-E and 8, can deliver on the order of 1 micron of displacement (sag) of the BCD body for a given number of turns, e.g., approximately 25 turns of threaded shaft for BCD actuators of the type illustrated in FIG. 8. This has been found to deliver about 160N of force causing such displacement, i.e., about 6 N/turn (160N/25 turns). 6N/thread pitch equals the spring rate and 25 turns*thread pitch equals the amount of travel.

A desired sag (curvature) range of displacement at the center of the curve of from, −1 to +8 microns means that, without special provisions for opposite acting force, such as by spring force, like the pre-loading spring discussed in regard to aspects of the embodiment of FIG. 9 et seq, a push only actuator would not be satisfactory. As discussed herein with respect to FIG. 9 et seq, a push only actuator, such as a bellows can be preloaded with a spring, e.g., to the −1 setting.

Figure 7C:
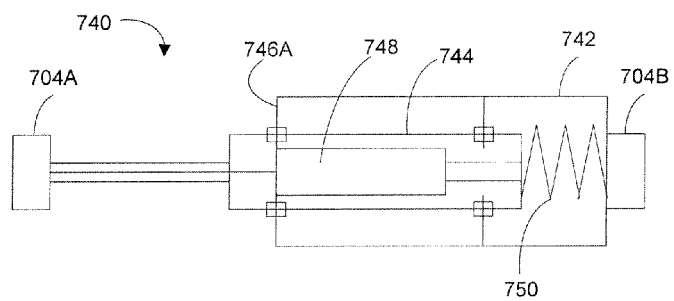

Another form of actuator which could be attached to end force blocks on a grating or for in-line force application to the side/top of the grating could be as illustrated schematically in FIG. 7C, with a spring for preloading the actuator, e.g., to the −1 micron sag setting. As illustrated in FIG. 7C, an actuator 740 has an outer frame 742 and an inner frame 744, with the inner frame top and bottom slideably engaging a rear wall 746A and an intermediate wall 746B of the outer frame 742 and an actuator driving mechanism 748 of one of the types noted elsewhere herein serving to apply a force intermediate the inner frame 744 and the outer frame 742 to shorten the distance between the end blocks 704A, 704B. The spring 750 can apply preloading force in the opposite direction.

Figure 7D:
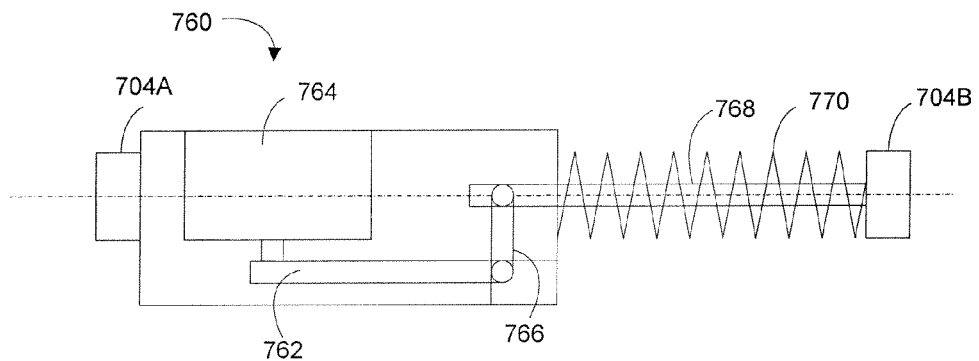

FIG. 7D illustrates schematically an actuator 760 applying a lever arm 762 to apply the force on the end blocks 704A, 704B. A lever arm 762 is also included in other embodiments described herein. The lever arm 762 can reduce the force required to be applied by the actuator driving mechanism 764. The driving mechanism 764 of FIG. 7D applies force to the lever 762 which in turn pulls the blocks 704A, 704B toward each other through connector arm 766 pivotally attached to a shaft 768 attached to the end block 704B. A spring 770 on the shaft 768 intermediate the right hand end block 704B can apply pre-loading force.

Figure 7E:
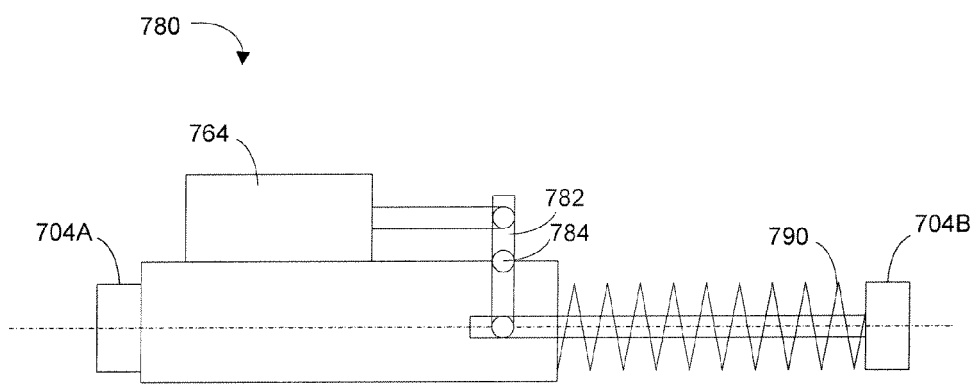

FIG. 7E illustrates a similar actuator 780 with a lever 782 pivoted about a fulcrum 784 and pivotally connected to a shaft 786 draws and blocks 704A, 704B toward each other, with a spring 790 for pre-loading force. It should be understood that the actuators illustrated and described herein are merely exemplary and other types of actuators and combinations of types of actuators could also be used. Types of actuators can include hydraulic, pneumatic, piezoelectric, a motor, a stepper motor, electromagnetic and magnetostrictive to name a few.

Figure 8:
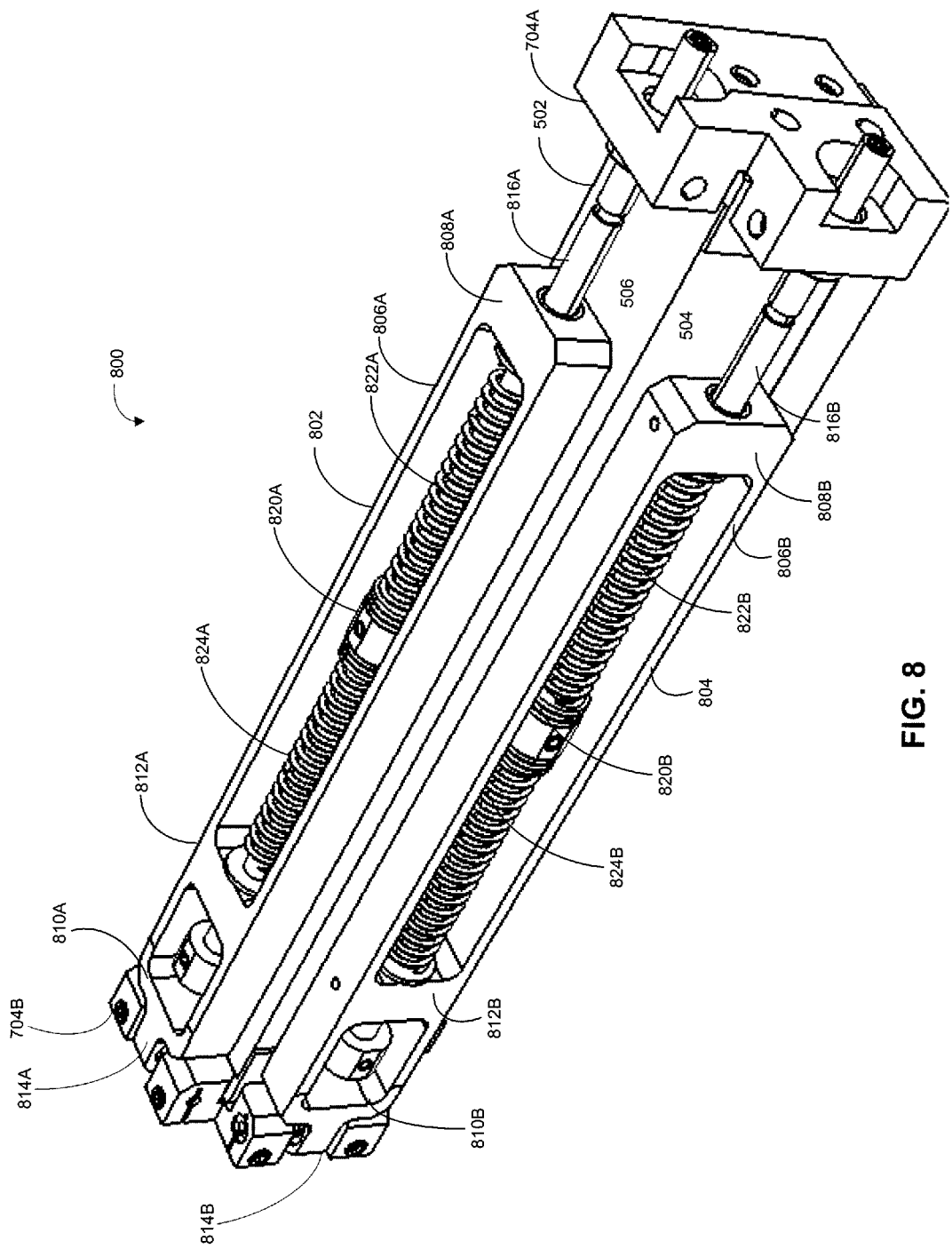
FIG. 8 is a perspective view of a dual action bandwidth control device, in accordance with aspects of an embodiment of the disclosed subject matter.

FIG. 8 is a perspective view of a dual action bandwidth control device 800, in accordance with aspects of an embodiment of the disclosed subject matter. The dual action bandwidth control device 800 includes a first bandwidth control device 802 and a second bandwidth control device 804, arranged, respectively on the back face 506 of the dispersive optical element body 502 and on the top face 504 of the dispersive optical element body 502. A pair of end blocks (force plates) 704A, 704B on either end and adapted to apply force to the body 502 from both BCDs 802, 804.

Each of the BCDs 802, 804 include a BCD frame 806A, 806B, respectively. The respective frames 806A, 806B, include a respective BCD frame forward bulkhead 808A, 808B, a BCD frame rear bulkhead 810A, 810B and a BCD frame intermediate bulkhead 812A, 812B. The respective rear bulkheads 810A, 810B includes a BCD frame rear bulkhead finger 814A, 814B each with a cylindrical mounting shaft opening (not shown).

A BCD cylindrical actuator shaft 816A, 816B extend through the front bulkhead 808A, 808B and intermediate bulkhead 812A, 812B and terminate on one end with a BCD shaft stop mechanism. A BCD shaft bearing extends through the front bulkhead 808A, 808B and include a BCD shaft bearing flange. A BCD threaded bushing extends through the forward force plate 704A and is internally threaded and receives a threaded portion of the BCD shaft.

A pair of L brackets 160 are glued respectively to the forward end 514 and the rear end 516 of the dispersive optical element body 502 and have suitable attachment mechanism to attach the respective end force plate 166 to the dispersive optical element body 502. The force plate 704A includes two pairs of force plate clamps, each with a force plate clamp tightening screw to tightly grip a respective rear bulkhead finger attachment pin of the rear and top BCDs 802, 804. The respective attachment pins each extend through a respective attachment pin bushing.

A BCD piston 820A, 820B is secured to the shaft 816A, 816B, e.g., by a set screw or other suitable fastener, and separated by each of a forward compression spring 822A, 822B and a rear compression spring 824A, 824B by a piston thrust bearing, having a thrust bearing plastic ring.

In operation the respective shaft 816A and/or 816B are rotated, manually or automatically, e.g., by a rotary stepper motor, or a linear stepper motor with a linear to rotary motion converter, responsive to a bandwidth controller actuator positioning signal. The rotating the shafts compresses the respective springs 822A, 822B and 824A, 824B and exerts a force on the respective frame 806A, 806B toward or away from the front end force plate 704A, depending on the direction of rotation of the respective shaft 816A, 816B and exerts a force on the rear end force plate 704B through the respective finger 814A, 814B to put the respective face 506, 504 in tension or compression. The BCD 802 affects the grating face as illustrated schematically in FIG. 5 and the BCD 804 affects the grating face 508 as illustrated in FIG. 6.

Such a dual acting bandwidth control device 800 can serve to twist the dispersive optical element body 502 as discussed above, affecting the bandwidth of the light amplified in the laser chamber (not shown) with which the dispersive optical element is associated as a center wavelength/bandwidth selection mechanism. The bandwidth may be affected differently for full width half max ("FWHM"), the bandwidth of the spectrum measured at the half of the maximum intensity peak point on the spectrum sidewalls and for E95%/E95, the width of the spectrum containing 95% of the intensity centered on the center wavelength of the spectrum. The intercoupling of the two BCDs 802, 804 may be such that the independence of the impacts on FWHM and E95 may be sufficiently compromised, or other detrimental effects, may result in the dual acting bandwidth control device 800 being less than ideal for bandwidth selection and control.

Figure 14A:
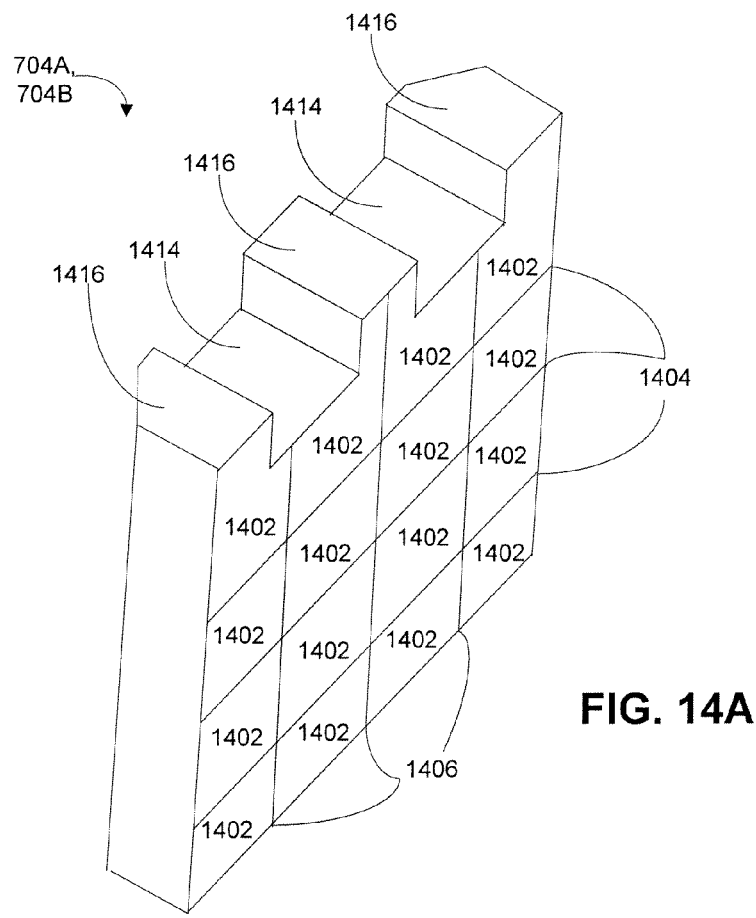
FIG. 14A is a perspective view of a force plate, in accordance with aspects of an embodiment of the disclosed subject matter.
Figure 14B:
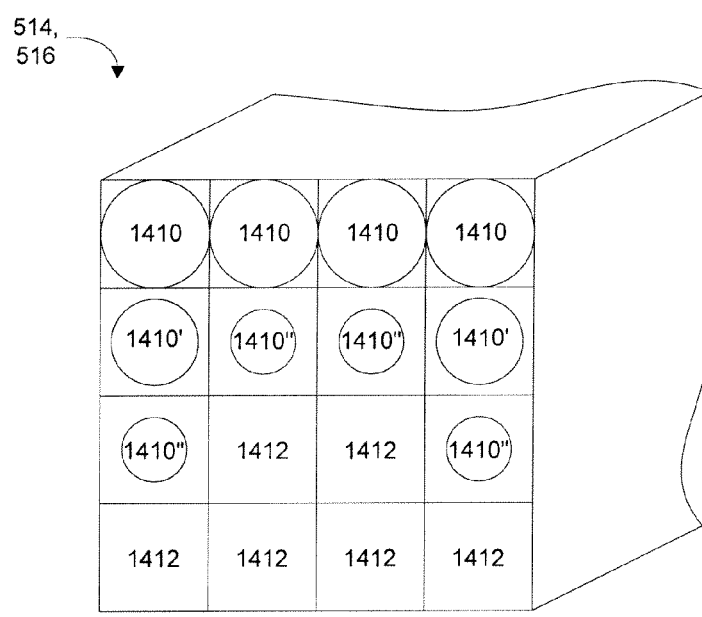
FIG. 14B is a perspective view of a front end or a rear end of a dispersive optical element body, in accordance with aspects of an embodiment of the disclosed subject matter.

FIGS. 9-12 illustrate another dual acting bandwidth control mechanism 900, in accordance with aspects of an embodiment of the disclosed subject matter. As shown in FIG. 9, the dual acting bandwidth control mechanism 900 utilizes a front end force plate 704A and rear end force plate 704B, illustrated in more detail in FIG. 14A. FIG. 14A is a perspective view of a force plate 704A, 704B, in accordance with aspects of an embodiment of the disclosed subject matter. FIG. 14B is a perspective view of a front end 514 or a rear end 516 of a dispersive optical element body 502, in accordance with aspects of an embodiment of the disclosed subject matter.

The force plate 704A, 704B, has multiple mounting pads 1402, formed by horizontal slots 1404 and vertical slots 1406 dividing a mounting face 1408 into the respective pads 1402. Some or all of the mounting pads 1402 may have placed thereon glue dots 1410, 1410', 1410" to attach the respective force plate 704A, 704B to the front end 514 or rear end 516 of a dispersive optical element body 502. The selected arrangement of the respective glue dots 1410, 1410', 1410" can localize the shear forces accordingly. As shown in FIG. 14B, the regions 1412 do not have glue dots placed thereon. As a result, the shear forces are not applied to the front surface 508 of the dispersive optical element body 502 and are instead applied more to the rear surface.

The selected location of the respective glue dots 1410, 1410', 1410" can localize an optimum pivot location. An optimum pivot location is a location where the vertical BCD and the horizontal BCD are minimally affected by each other. For example in an optimum pivot location, adding or reducing the amount of force the vertical BCD applies to the dispersive optical element body 502 does not substantially reduce or increase the force applied by the horizontal BCD on the dispersive optical element body 502. Similarly, in an optimum pivot location, adding or reducing the amount of force the horizontal BCD applies to the dispersive optical element body 502 does not substantially reduce or increase the force applied by the vertical BCD on the dispersive optical element body 502.

The flexture elements described herein act to substantially decouple or isolate the force vectors from the vertical BCD from reducing or increasing the force applied by the horizontal BCD on the dispersive optical element body 502. The flexture elements described herein also act to substantially decouple or isolate the force vectors from the horizontal BCD from reduce or increase the force applied by the vertical BCD on the dispersive optical element body 502.

It should be noted that the respective glue dots 1410, 1410', 1410" are shown differing sizes and/or strengths so as to add yet another dimension of localizing the shear stresses in the desired locales of the front end 514 or rear end 516 of a dispersive optical element body 502. The force plate 704A, 704B may also include a pair of horizontal BCD mounting bracket shelves 1414 and vertical (Orthogonal) BCD ("OBCD") mounting surfaces 1416.

Turning again to FIGS. 9-12 there is illustrated an orthogonal (e.g., vertical) BCD ("OBCD") which may apply tensile or compressive stress to the dispersive optical element body 502 in a manner to effect the progressive widening of the grooves 210 as shown partly schematically in FIG. 6. The dual acting bandwidth control mechanism has a pair of rear mounting brackets 902, which can be made, e.g., of Invar, and serve to connect the rear force plate 704B through a pair of mounting bracket fingers each extending into a respective shelf 141 and a mounting bracket angle arm, respectively attached to a top or bottom arm of horizontal BCD attachment yoke 904 yoke as well as connection by bolting to the yoke. Similar brackets 902 couple the bottom of the yoke 904 to the rear end force plate 704B. The BCD attachment yoke 904 has a mounting yoke bearing to receive a shaft 906. The shaft 906 includes a flexure 910. Each thrust bearing 912 may have an extension.

Forward mounting brackets 902' similarly couple the forward force plate 704A to the top and bottom of a forward end flexured mounting plate 914 having a flexure element 916 connecting it to a horizontal BCD flexure coupling plate 918, connected to the forward end 920 of the horizontal BCD 922 by a similar flexure link (not shown) within the space 924 shown in more detail in FIGS. 13A, 13B. Horizontal BCD 922 is substantially similar to BCDs 802, 804 discussed in the related text and shown in FIG. 8.

FIGS. 13A and 13B are perspective views of flexured elements 916, 918, in accordance with aspects of an embodiment of the disclosed subject matter. The flexured elements 916, 918 and end blocks 300 may be made of Invar. The OBCD can have one or more, e.g., a front and a rear, flexured elements connecting the OBCD to the respective front and rear force plates 704A, 704B, e.g., by being bolted to the OBCD mounts 904. The flexured elements 916, 918, have a flexured connector end block connector 1302, screw holes 1304 and a flexured connector end bock wall 1306. The connector block 1302, as shown, forms an actuator L bracket 1308 although it should be understood the flextured elements 916, 918 could be any sort of connector. The connector plate 1306 includes connector openings 1310 that can be threaded if desired. The flexure 916, 918 allows for rotation of the blocks 1302, 1306 with respect to each other about the axis formed by the length of the flexure 1312.

Referring again to FIG. 9 the OBCD actuator 900 includes an OBCD actuator frame 930. The OBCD actuator frame 930 includes a pair of top horizontally extending ridges, a rear wall, and a bottom wall. The rear wall is connected, e.g., by bolting to a tapering beam 932. The tapering beam 932 includes longitudinal structural members 934 and vertically extending structural stiffeners 936. The tapered beam 932 may be connected to a flexured end plate 940 which may be connected to the L bracket portion of the connector member by threaded connectors, such as bolts. The flexured end plate 940 element includes a flexure 942.

The actuator frame 930 may include a pair of top horizontal beams to which may be mounted, as by bolting, an actuator frame support brace. An actuator bellows 950 can be made of aluminum or stainless steed. The actuator bellows 950 is attached to the frame 930, as by bolting to the frame rear wall attaching to a hollow cylindrical bellows rear plate. The actuator bellows 950 is also be attached through a cylindrical bellows front plate by bolting with bolts to an actuator lever arm 952. The actuator bellows 950 can also include a bellows actuation fluid or liquid.

The actuator lever arm 952 is coupled to a downwardly extending angle arm 954. The angle arm 954 is coupled to a thin flexure sheet 960 extending horizontally from the frame bottom wall as well as thin flexure sheets 962 extending between the lever arm 952 generally in line with a centerline axis of the lever arm angle arm 954. The end of the angle arm 954 is also be attached to the connector block 964 by a thin flexure sheet 966.

Together the flexure sheets 960, 962, 966 form a pivot point in the lower extent of the angle arm 952 at the intersection of the planes of the flexure sheet 960 and flexure strips 962, 966, about which the actuator lever arm 952 pivots when the bellows 950 expands or contracts, applying force through the flexure 966 to the connector block 940 and thence to the forward force plate 704A through the forward flexured connector 940.

The frame 950 has an overhang 972. The overhang 972 includes a cylindrical passage 974 receiving a preloading spring 976, which may also be received in a cylindrical opening 978 in the upper end of the lever arm 952. The passage 974 can also include a threaded spring compression mechanism 980. The threaded spring compression mechanism 980 applies compressive force to the spring 976 to preload the dispersive optical element body 502 to put a bend in the body 502 in the opposite direction than that applied when the actuator bellows expands.

The bellows 950 may be expanded or collapsed from some central position, e.g., the preloaded position established under the influence of the preloading spring 976, by the application of pressure through the introduction or removal of a gas, fluid or liquid into or out of the bellows 950 through fluid opening 982 in the bellows end plate. The pressurizing gas, fluid or liquid may come from an actuator fluid delivery system 984, through fluid delivery tubing 986, supported by a fluid delivery system tubing support 988.

It will be understood by those skilled in the art that the above described OBCD can apply a force to the dispersive optical element along its top, e.g., a compressive force, which can exert a force on the centerline axis of the body in the vertical direction (again understanding that throughout horizontal and vertical are in relation to an orientation of the line narrowing module such as shown in FIG. 8 as a top view of the module, and not in relation to any actual orientation of the module when in actual use, which, indeed may be, e.g., with the plane of the paper in the vertical plane and the top view of FIG. 10 actually being a side view, relative to horizontal and vertical in the installed module in use). Such force can deform the grooves of the dispersive optical element in the direction show in the side view (again oriented to the view of the line narrowing module in FIG. 10 as a top view) of FIG. 6.

A controller 980 is coupled to the OBCD actuator 900. The controller can include a feedback loop analyzing the bandwidth of the light beam reflected from the reflective surface and adjusting the shape, e.g., bending, of the reflective surface accordingly, by adjusting the forces applied by the actuators. The controller 980 can include software and hardware for operating the OBCD actuator 900 and for analyzing the bandwidth of the light beam reflected from the reflective surface and adjusting the shape of the reflective surface. The controller 980 can be linked to or include other controllers such as a central server or system controller (not shown) and a pressure controller, not shown, such as a QB1T controller, made by Proportion Air of McCordsville, Ind. Such a controller can use a 4-20 mA input current to set the pressure from 0 to a maximum pressure defined by the bandwidth tuning range desired and the mechanical design. Fore example, 5 or 10 bar can be used as maximum pressure.

The required pressure (twist) to reach an OBCD tuning range of 300 fm has been found to be very reasonable with the design illustrated as an example of FIGS. 5-8 and was determined to be somewhat less that had been expected in some instances. Crosstalk between HBCD and OBCD is small, e.g., less than about 20 nm induce sag in the HBCD.

The flexured elements, such as the sheet 960 and strips 962, 966, and the connectors 940 may be made of a very low CTE material like Invar. It is understood that other materials with low thermal expansion may be used in the mechanical design, such as machined parts from ULE glass.

The frames and tapered beam may be made of aluminum, including the connector block 940 and flexure 1312, such a 7075 aluminum, as may the flexure sheet 960 and strip flexures 962, 966 forming the pivot point of the actuator lever arm 952 connected to the forward end of the actuator bellows 950. The flexured end block 914 as well as the rest of the BCD housing frame 922 and intermediate flexure plate 916 may also be made of Invar or aluminum or other suitable material having low CTE and good strength, or a suitable combination of the two. The actuator frame 930 may also be made of aluminum, such as 7075 aluminum. The plates 902 may be made of Invar or aluminum or the like.

Applicants have determined that such deformation can extend the upper limit of the BW tuning range in such an LNM to >0.50 pm, e.g., with a range margin to cover a 0.25 to 0.50 pm system BW tuning specification.

Effects on bandwidth have been shown to survive the amplification laser in a seed laser amplifier laser configuration, such as a power oscillator, like a power ring amplifier ("PRA"). Bandwidth vs Magnification, in, e.g., a variable magnification Line Narrowing Module, such as described in U.S. Pat. No. 7,366,219 referenced above, can be shifted by approximately 70 fm, with, however, beam profiles and divergence profiles not significantly altered by the vertical applied force, at the levels of grating deformation produced according to aspects of the disclosed subject matter, e.g., on the order of that illustrated in FIG. 5. With higher magnification in the incident beam on the dispersive optical element the applied force can making the relation between force and bandwidth modification approximate linearity. It has been found that the horizontal BCD curve, can be shifted by approximately ½ turn for such a range of vertical force\BW shift. It has also been shown that a shift of 70 fm via application of force in the vertical direction on the dispersive optical element body 502 does not introduce major degradation of wavelength stability, especially compared to demagnification alone, and the bandwidth continues to trace a trusted standard as a check to on-board metrology even after vertical force is applied.

It has also been determined that the OBCD according to aspects of the disclosed subject matter, as illustratively described above, can serve to significantly mitigate bandwidth resonances, effectively acting as an adaptive optic to match the incoming wavefront. The latter can have distortions due to passage through acoustic gas perturbations, which impact bandwidth. By fine-adjusting the OBCD in the neighborhood of zero grating vertical deflection, such bandwidth perturbations are minimized, in comparison with those occurring in normal LNM utilization to date.

It has also been found to be very useful to use the OBCD, according to aspects of the disclosed subject matter, in combination with a variable aperture at the entrance of the Line Narrowing Module containing the OBCD mechanism. An aperture limiting the size of the beam incident on the grating, whose dimension parallel to the direction of the grating grooves can be adjusted, further allows control of the light's bandwidth when the grating is under static, fixed bending. This combination is useful, for example, when optimizing simultaneously both the bandwidth and divergence properties of the beam.

Another variation of the disclosed subject matter is to use the OBCD actuation in combination with beam expansion in the vertical direction, generally parallel to the direction of the grooves. For a fixed grating vertical deflection, expanding or reducing the incident beam on the grating in the vertical direction produces tuning of the bandwidth, as a wider\narrower range of wavelengths are selected by the chirped grating and included in the overall reflected spectrum.

In addition the OBCD illustratively described above does not conflict with utilization of the existing horizontal BCD.

The vertical bending of the grating block 502 has been seen to produce a non-uniform groove spacing ("fanning") and tilt of the groove lines with respect to the vertical axis. In Littrow, rays incident on the central part of the grating are diffracted back along the direction of incidence. However, rays incident on the far right of the grating are no longer diffracted in-plane because the grooves are tilted: rays are back-diffracted at a slight downward angle B with respect to the incident direction A, as illustrated in FIG. 6. Beam rays incident on the left end of the grating are similarly diffracted at the same small angle B with respect to the incident beam, but with the opposite sign. Therefore, the light beam returning from the grating exhibits a twist as a result of the groove change in orientation.

Figure 15A:
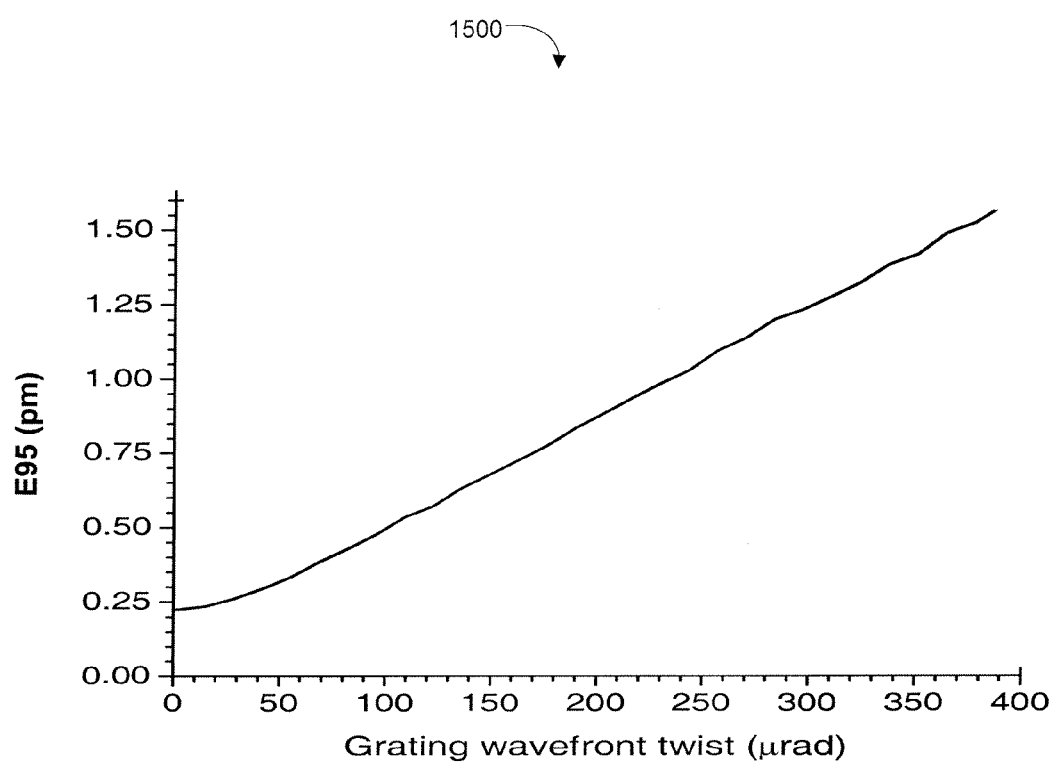
FIG. 15A is a graph of a E95 bandwidth, in accordance with aspects of an embodiment of the disclosed subject matter.

Applicants have made a rough estimate of grating deformation from Zygo interferometric measurements required for various bandwidth tuning targets. By way of example: for a tuning range of 250 fm (250 fm-500 fm) the measured wavefront twist induced is 100 µrad, which corresponds to a radius of curvature R=3.5 Km and a grating bending sag of 4.4 um. For a tuning range of 1.2 pm (0.25-1.45 pm), the radius of curvature decreased to approximately 0.98 Km, and the induced grating sag was 16 um. This deflection produced a wavelength chirp, top to bottom of the grating, of 0.21 pm/mm FIG. 15A is a graph 1500 of E95 bandwidth, in accordance with aspects of an embodiment of the disclosed subject matter. The E95 bandwidth tuning is compared to a level of grating vertical bending, e.g., wavefront twist from Zygo interferometry.

For comparison, the radius of curvature of a typical grating with adjusted horizontal BCD is of the order of about 40 Km and a maximum induced sag is about 0.63 um.

With regard to the effect of modifying bandwidth via utilization of an OBCD, one must consider the coupling between horizontal and vertical BCDs, beam parameter changes, and metrology, such as changes in spectral shape that can modify the on-board metrology tracking a trusted measuring instrument, such as an LTB spectrometer, especially for E95.

Coupling between vertical and horizontal BCD has been minimized to a negligible horizontal BCD compensation, e.g., less than about 20 nm of induced sag.

The following Table I indicates parameters achieved due to the utilization of a dual acting bandwidth control mechanism according to aspects of an embodiment of the disclosed subject matter as illustrated in FIGS. 5-8.

TABLE I

| | OBCD (pneumatic) |
|---|---|
| Tuning speed | 0.2-1.5 pm full range |
| Actuator Speed | Less than about 1 second, full range of actuation |
| Actuator pre-load | adjustable, about 10% of full range of deflection in the opposite direction to pneumatic operation |
| Automated actuation resolution | Less than about 10 fm of E95 resolution |
| Pressure range for pneumatic actuation | 0-5 bar is the preferred range, can vary depending on application |

Applicants had considered a number of actuator options, such as pneumatic, as illustrated; piezo-electric material, or other similar actuatable deforming material such as magnetostrictive material; a motor attached to the manual lead through shaft, such as may be used with an embodiment such as shown in FIG. 8; electro-magnetic; hydraulic (perhaps an equal or better solution that shown in FIGS. 5-8, and similar in design, though also perhaps more expensive. Criteria considered were technical risks, power dissipation, speed, necessary LNM modifications, the availability of GRAS materials for such an actuator, and lifetime. For various reasons the embodiment according to what is illustrated in FIGS. 9-12 was determined to be most suitable, though one or more of these options, especially, e.g., a hydraulic embodiment, could be utilized and achieve more or less the same results as are envisioned for the disclosed subject matter of FIGS. 9-12.

Regarding the pneumatic embodiment illustrated in FIGS. 9-12, lifetime was found to be a function of the pressure controller life and robustness of the mechanical components transmitting the force to the dispersive element's body. Generally acceptable optical materials (GRAs materials) could be used in the construction of the line narrowing module (LNM). A 100 mm diameter bellows was determined to be able to apply 2500N of force with a 3 bar (43 psi) gas pressure in the bellows, such as helium or air pressure. The device is a push only controller, thus necessitating a spring mechanism or the like for applying force to the grating body 502 in the opposite direction if necessary, e.g., for pre-loading.

The utilization of a plurality of independent glue dot receiving surfaces has been adopted, as illustrated in FIGS. 14A and 14B to reduce the risk of glue dot de-bonding at the end blocks 704A, 704B over the life of the vertical BCD (the OBCD) actuator. This can avoid the possibility of wavefront distortion at the end portions of the grating, e.g., had it been necessary to resort to full area gluing instead of the former glue dots design, not employing the individual surfaces of FIG. 14A.

Since manual actuation may be needed for adjusting the twist of the grating body 502, e.g., to define a baseline for an automatic actuation, the horizontal BCD, according to existing BCD design may still be utilized. In addition controlling the grating curvature in two different planes may have other beneficial results, such as more sensitivity in selecting/controlling bandwidth, independent selection/control of FWHM over E95, etc.

Figure 15B:
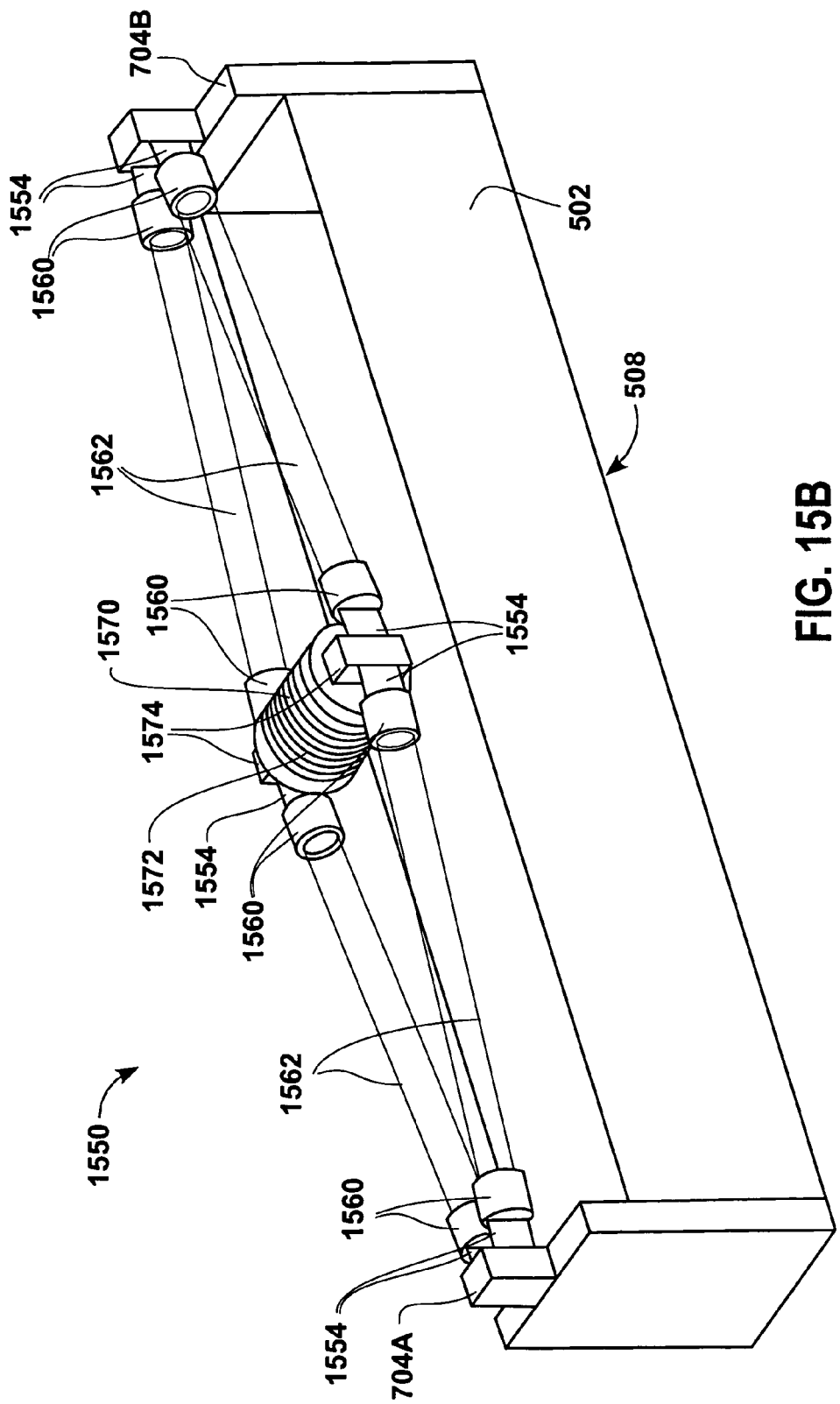
FIG. 15B is a perspective view of another apparatus for bending a dispersive optical element, such as a grating, according to aspects of an embodiment of the disclosed subject matter.

FIG. 15B is a perspective view of another apparatus 1550 for bending a dispersive optical element, such as a grating, according to aspects of an embodiment of the disclosed subject matter. As illustrated in FIG. 15A, a horizontal BCD is shown in the orientation of FIG. 5, i.e., with the grating face 508 on the bottom and the top of the grating body 502 facing frontward as viewed in FIG. 14A, i.e., generally in the plane of the paper. Two end force blocks/plates 704A, 704B are shown attached to the forward and rear ends of the grating body 502, e.g., by gluing, and each can have a flexure plate 1554, which may be integral with the respective end plate 704A, 704B. Each of the flexure plates 1554 are each coupled to a pair of rod holders 1560. The rod holders 1560 each hold is coupled to a respective end of a respective rod 1562.

The actuator 1570 includes bellows 1572 or other expansive or contractive mechanism. The bellows 1572 are coupled to a flexure plate 1574. Each flexure plate 1574 is coupled to a flexure element 1554. Each flexure element 1554 is coupled to the respective ends of the respective rods 1562 through rod ends 1560.

In operation, as the actuator 1570 is expanded, e.g., by introduction of a pressurized fluid such as a liquid, e.g., hydraulic oil or water, or a gas, e.g., helium or nitrogen or air into the bellows 1572, a force is exerted on the two end plates 1574 pulling them together generally in a plane through the centerline axes of the rods 1562, thus bending the grating face 508. It will be understood that the grating face bending mechanism 1550 shown in FIG. 15B could also be oriented to deform the grating face as illustrated in FIG. 6, that is, generally parallel to the grating top surface 504.

The grating body deforming mechanism 1550 as illustrated in FIG. 15B can, therefore provide a simple method to unidirectionally bend the grating body 502 for increasing bandwidth while minimizing materials and compensating for temperature changes. A curve is induced in a grating by generating the tensile force between the two ends. The tensile members, e.g., the rods 1562 and flexures 1554 can are made of the same material as the grating body 502, which may be selected to have a relatively very low coefficient of thermal expansion, or such other with a relatively very low CTE, such as Invar®, or another materials that combines very low CTE with lighter weight, in order to minimize the thermal expansion difference between the grating substrate body 502 and the disclosed subject matter. Any residual thermal expansion differential of the combination of the flexures 1554 and rods 1562 can be compensated by maintaining a constant pressure in the bellows 1572, and thus, a constant force. The embodiment of FIG. 15B can provide a force amplifier with gains greater than 7×. The flexures 1554 could also be made of a suitable light weight metal, such as aluminum, e.g., 7075 aluminum.

Figure 16A:
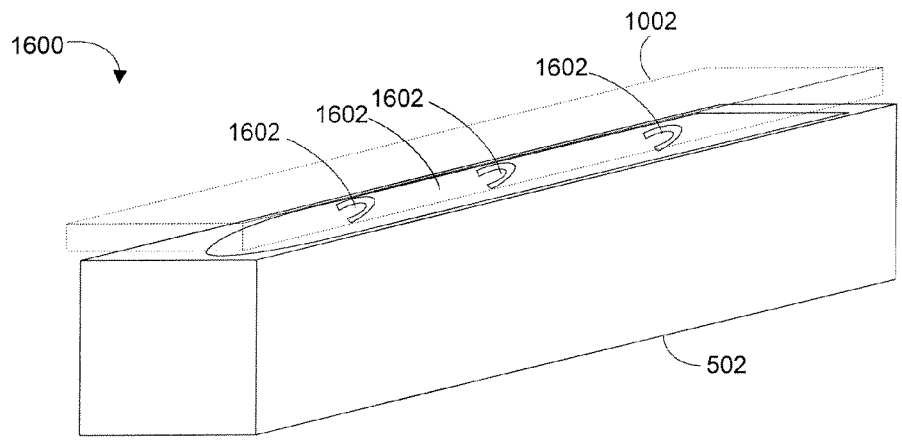
FIGS. 16A and 16B schematically illustrate a flexured grating mount that may be useful according to aspects of an embodiment of the disclosed subject matter.
Figure 16B:
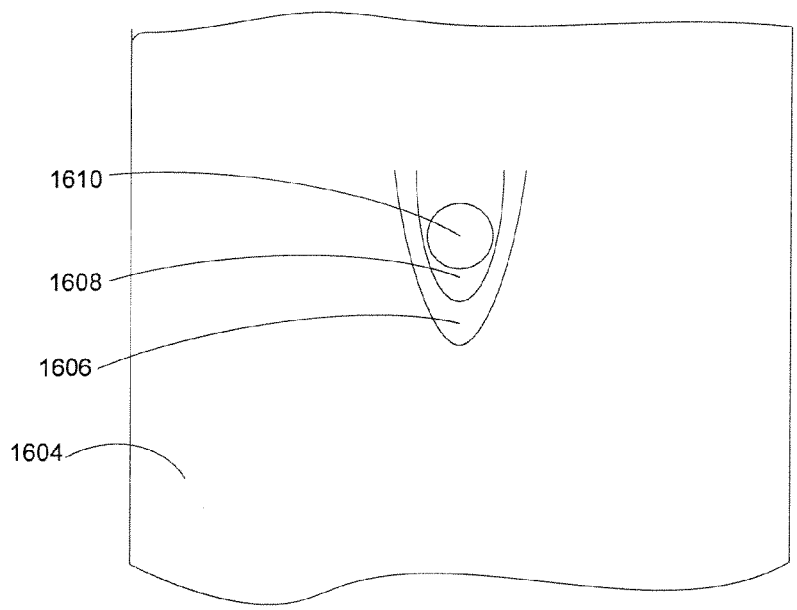

FIGS. 16A and 16B schematically illustrate a flexured grating mount 1600 that may be useful according to aspects of an embodiment of the disclosed subject matter. The grating mount 1600 can be attached to the floor of a LNM housing 1002 as shown in FIG. 10. In addition to other flexured connections to allow for differential thermal expansion between the grating made, e.g., of ULE and the mounting/housing made of aluminum, there may be utilized flexures 1602 to account for deformation of the grating body 502 by such as the OBCD. It will be understood that the flexures that have been used in the past to account for differential thermal expansion operated in a plane that generally allowed for accounting for deformation of the grating body 502 by the prior form of BCD, herein sometimes referred to as the HBCD.

The bending of the grating body is accommodated by the OBCD, flexured mounting points 1602 allowing for movement of tarts 1608 of the grating in a plane perpendicular to the surface of the mounting 1608 are added. These may take the form, by way of example, of one or a plurality of vertical flexure mounts, i.e., in line with the force applied to the grating top to account for the deformations such as illustrated partly schematically in FIG. 6. The flexures 1602 include slots 1606, which may generally be in a U shape, but could also have, e.g., squared corners, forming tongues 1608 that allow for flexure in the direction normal to the two surface of the grating mount. These could also be formed to have a vertical pre-stressed upward displacement to account for any negative bend in the form, e.g., of the referenced −1 μm pre-loading bend.

By examining the impact of multiple action, such as dual action, application of bending force to the grating body, i.e., in two planes a large change of ratio of FWHM and E95, different measures of bandwidth, for different levels of force applied to the pertinent actuator, e.g., the bellows of the embodiment of FIGS. 9-12 suggest significant change of spectral line shape with grating twist. Twisting the grating can lead to a rotation of the beam profile, which may appear more severe after the MO, but may be somewhat masked after the amplifier stage, such as a PRA stage. There may also be a vertical shift of the beam, which could also be a result of the relative alignment of the MO and PRA beam axes.

It will be understood that the bellows 950, 1572 according to aspects of embodiments of the disclosed subject matter may be operated by pressurized fluid, either compressible, such as pressurized air or gas, such as, helium, i.e., pneumatically, or non-compressible fluid, such as hydraulic oil of water, i.e., hydraulically and the term pressurized fluid is meant to cover both types of actuators.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A bandwidth selection mechanism comprising:
a dispersive optical element having a body including a reflective face of dispersion including an area of incidence extending in a longitudinal axis direction along the reflective face of the dispersive optical element;
a first end block, disposed at a first longitudinal end of the body;
a second end block, disposed at a second longitudinal end of the body, the second longitudinal end being opposite the first longitudinal end;
a first actuator mounted on a second face of the dispersive optical element, the second face being opposite from the reflective face, the first actuator having a first end coupled to the first end block and a second end coupled to the second end block, the first actuator being operative to apply equal and opposite forces to the first end block and the second end block to bend the body along the longitudinal axis of the body and in a first direction normal to the reflective face of the dispersive optical element; and
a second actuator mounted on a third face of the dispersive optical element, the third face being normal to the reflective face, the second actuator having a first end coupled to the first end block with a first flexure and a second end coupled to the second end block with a second flexure, the first actuator being operative to apply equal and opposite forces to the first end block and the second end block to bend the body along the longitudinal axis of the body, in a second direction perpendicular to the reflective face of the dispersive optical element, the second direction also being perpendicular to the first direction the second actuator including a pressurized fluid force application mechanism.

2. The bandwidth selection mechanism of claim 1, wherein the pressurized fluid force application mechanism is a pneumatic mechanism.

3. The bandwidth selection mechanism of claim 1, wherein the pressurized fluid force application mechanism is a hydraulic mechanism.

4. The bandwidth selection mechanism of claim 1, wherein the pressurized fluid force application mechanism is variable.

5. The bandwidth selection mechanism of claim 1, further comprising:
a manual preload adjustment at constant, fixed deflection on at least one of the first actuator and the second actuator.

6. The bandwidth selection mechanism of claim 5, further comprising a feedback control loop on the second actuator in response to a spectral parameter of the light.

7. The bandwidth selection mechanism of claim 1, further comprising a pneumatic actuation and feedback control loop on at least one of the first actuator and the second actuator, in response to spectral parameters of the light.

8. The bandwidth selection mechanism of claim 1, further comprising a variable aperture positioned between the incident beam and the reflective face of the dispersive optical element.

9. The bandwidth selection mechanism of claim 8, wherein the variable aperture has a variable dimension along a direction of bending of the second actuator.

10. The bandwidth selection mechanism of claim 1, further comprising a light beam expander for expanding an incident a light beam across the area of incidence.

11. A method of selecting bandwidth comprising:
expanding an incident light beam across an area of incidence of a reflective surface of a dispersive optical element;
bending the reflective surface of the dispersive optical element with a first bending force applied by a first actuator in a first direction normal to the reflective face of the dispersive optical element;
bending the reflective surface of the dispersive optical element with a second bending force applied by a second actuator in a second direction perpendicular to the reflective face of the dispersive optical element, the second direction also being perpendicular to the first direction; and
decoupling the second bending force through at least one flexure so that decoupled second force does not increase or decrease the first force.

12. The method of claim 11, wherein in bending the reflective surface of the dispersive optical element in the first direction uniformly varies a spacing between dispersive features on the reflective surface as a function of position in the first direction.

13. The method of claim 11 further comprising:
modifying a dimension of the incident light beam upon the reflective surface to encompass different regions of the bent reflective surface.

14. The method of claim 11, wherein the reflective surface is bent in alt least one of the first direction and the second direction in response to feedback from a property of the reflected light beam.

* * * * *